(12) United States Patent
Kim et al.

(10) Patent No.: US 11,978,374 B2
(45) Date of Patent: May 7, 2024

(54) DISPLAY APPARATUS

(71) Applicant: LG ELECTRONICS INC., Seoul (KR)

(72) Inventors: Sungeun Kim, Seoul (KR); Woojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/786,964

(22) PCT Filed: Dec. 26, 2019

(86) PCT No.: PCT/KR2019/018440
§ 371 (c)(1),
(2) Date: Jun. 17, 2022

(87) PCT Pub. No.: WO2021/132757
PCT Pub. Date: Jul. 1, 2021

(65) Prior Publication Data
US 2023/0040472 A1 Feb. 9, 2023

(51) Int. Cl.
*G09G 3/00* (2006.01)
*G06F 1/16* (2006.01)
(Continued)

(52) U.S. Cl.
CPC ........... *G09G 3/035* (2020.08); *G06F 1/1624* (2013.01); *G06F 1/1652* (2013.01);
(Continued)

(58) Field of Classification Search
CPC ....... G06F 3/04845; G06F 2203/04803; G06F 2203/04806; G06F 1/1601; G06F 1/1624; G06F 1/1652; G06F 3/0481; G06F 3/048; G06F 2203/04102; G06F 3/04817; G06F 3/0482; G09G 2340/04; G09G 2380/02;
(Continued)

(56) References Cited

U.S. PATENT DOCUMENTS 5,452,150 A * 9/1995 Henneberger ....... G11B 15/087
6,012,112 A * 1/2000 Brase .................. G11B 27/105
386/E5.064

(Continued)

FOREIGN PATENT DOCUMENTS

JP 2005-321702 A 11/2005
KR 10-2015-0095538 A 8/2015
(Continued)

*Primary Examiner* — Mihir K Rayan
(74) *Attorney, Agent, or Firm* — Birch, Stewart, Kolasch & Birch, LLP

(57) ABSTRACT

A display apparatus including a housing; a display; a roller accommodated in the housing to rotate and roll or unroll the display; and a processor configured to in response to receiving a command to display content, control the roller to rotate and unroll the display from the housing so the display is drawn out and extended from the housing, and control the display to display an entire image of the content while simultaneously expanding a size of the entire image of the content as the display is being extended from the housing so a partial portion of the content is not blocked from being viewed as the display is drawn out and extended from the housing.

18 Claims, 20 Drawing Sheets

(51) Int. Cl.
*G06F 3/048* (2013.01)
*G06F 3/0481* (2022.01)
*G06F 3/04817* (2022.01)
*G06F 3/0482* (2013.01)
*G06F 3/04845* (2022.01)
*G09F 9/30* (2006.01)
*G09G 5/373* (2006.01)
*H04N 21/431* (2011.01)

(52) U.S. Cl.
CPC ........ *G06F 3/0481* (2013.01); *G06F 3/04817* (2013.01); *G06F 3/0482* (2013.01); *G06F 3/04845* (2013.01); *G09F 9/301* (2013.01); *G09G 5/373* (2013.01); *G06F 3/048* (2013.01); *G06F 2203/04102* (2013.01); *G06F 2203/04803* (2013.01); *G06F 2203/04806* (2013.01); *G09G 2340/04* (2013.01); *G09G 2340/045* (2013.01); *G09G 2380/02* (2013.01); *H04N 21/4316* (2013.01)

(58) Field of Classification Search
CPC .. G09G 5/373; G09G 3/035; G09G 2340/045; H04N 5/64; H04N 21/236; H04N 5/445; H04N 21/4316; H04N 21/42204; H04N 21/4312; G09F 9/301
See application file for complete search history.

(56) References Cited

U.S. PATENT DOCUMENTS

| | | | |
|---|---|---|---|
| 10,013,955 B2* | 7/2018 | Oh | G06F 3/0482 |
| 10,216,398 B2* | 2/2019 | Woo | G09G 5/373 |
| 10,613,587 B2* | 4/2020 | Hong | H04N 21/4222 |
| 10,977,771 B2* | 4/2021 | Jeong | G06F 3/0487 |
| 11,391,080 B2* | 7/2022 | Jones | E04B 2/827 |
| 11,442,679 B2* | 9/2022 | Kim | B65H 75/4486 |
| 2013/0091457 A1* | 4/2013 | Ferri | G06F 3/04812 |
| | | | 715/781 |
| 2016/0306534 A1* | 10/2016 | Woo | G06F 1/1652 |
| 2017/0103735 A1* | 4/2017 | Oh | G09G 5/006 |
| 2017/0140504 A1* | 5/2017 | Jeong | G06F 1/1677 |

FOREIGN PATENT DOCUMENTS

| | | |
|---|---|---|
| KR | 10-2016-0150533 A | 12/2016 |
| KR | 10-2018-0128261 A | 12/2018 |

* cited by examiner

FIG. 16
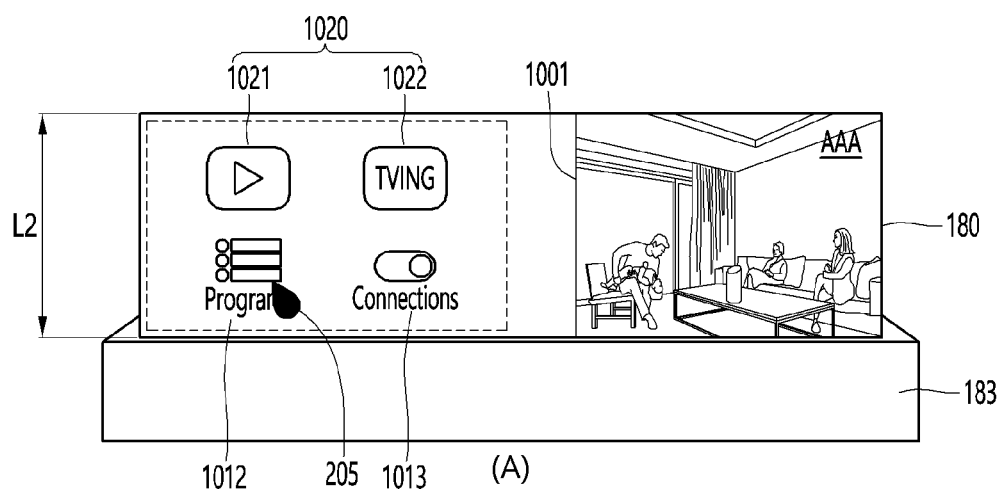
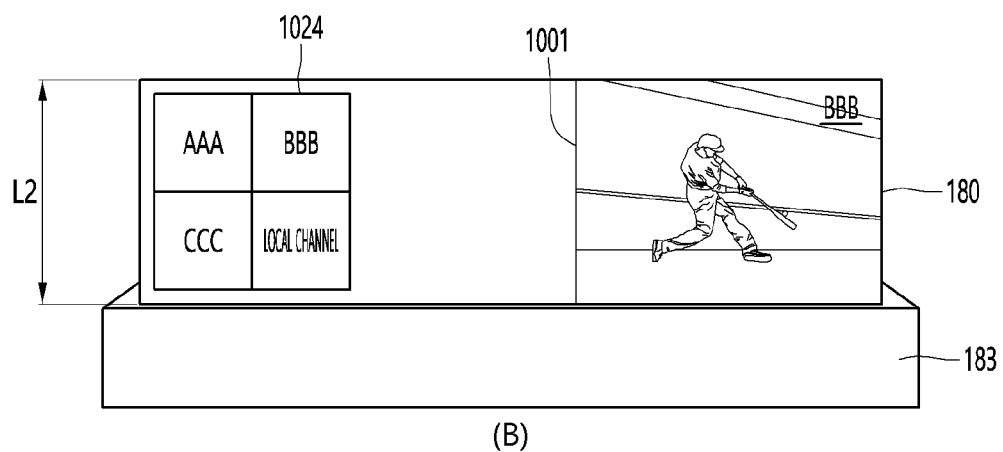

FIG. 17
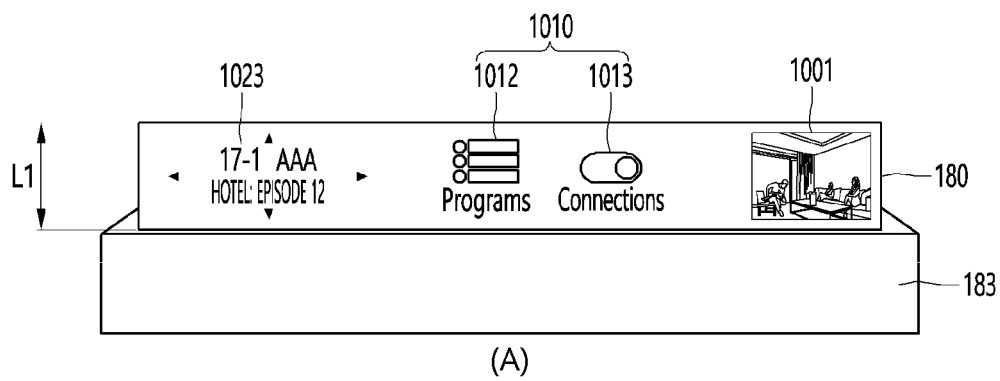
(A)
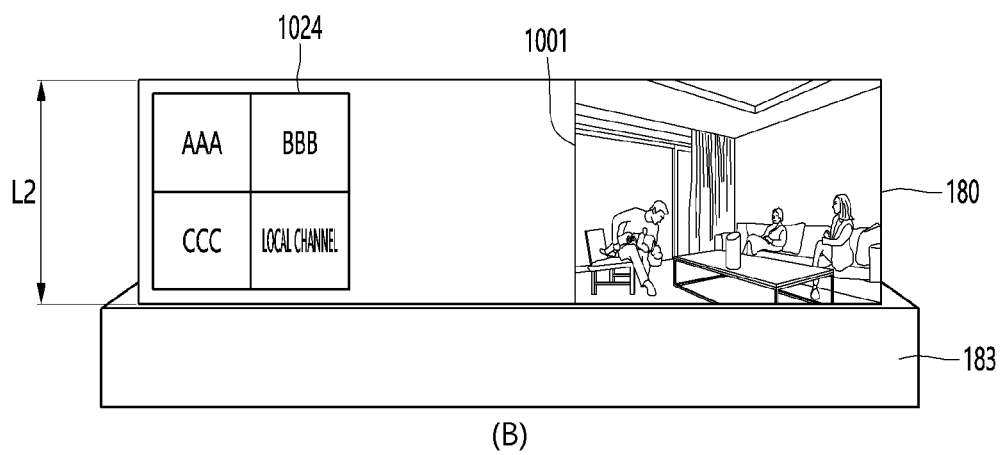
(B)

FIG. 18
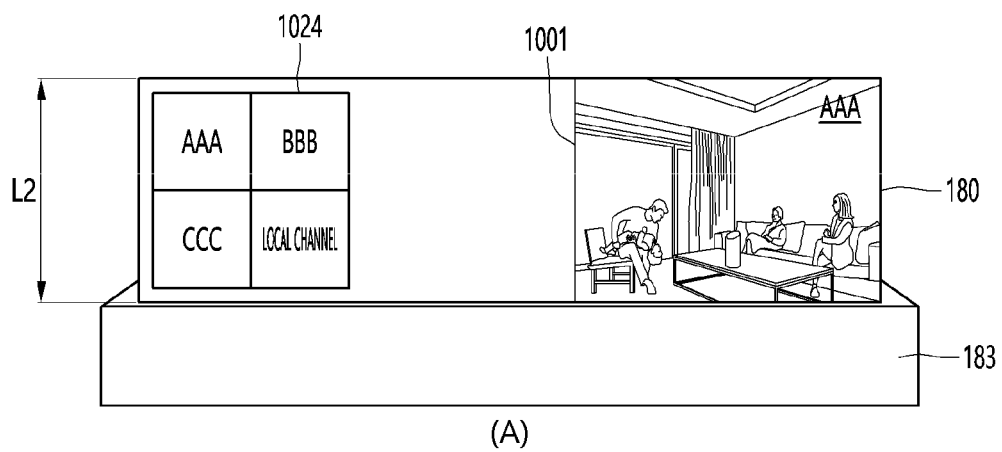
(A)
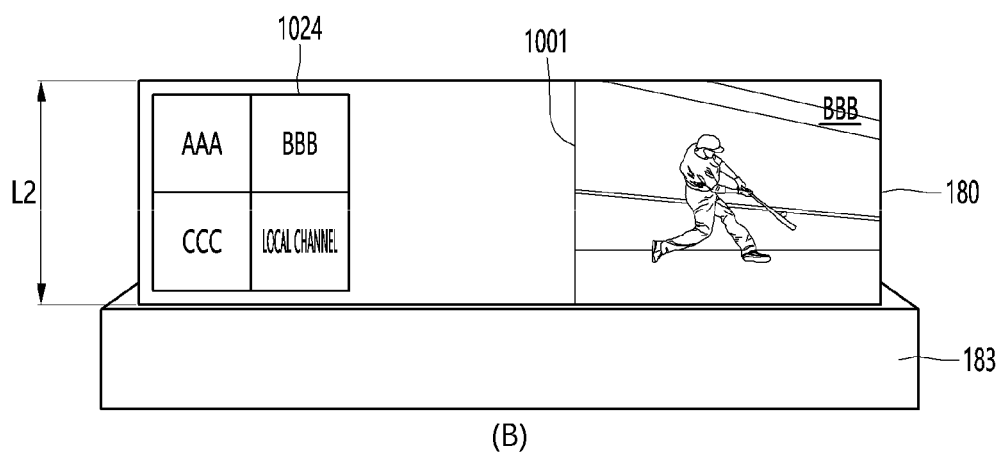
(B)

FIG. 20
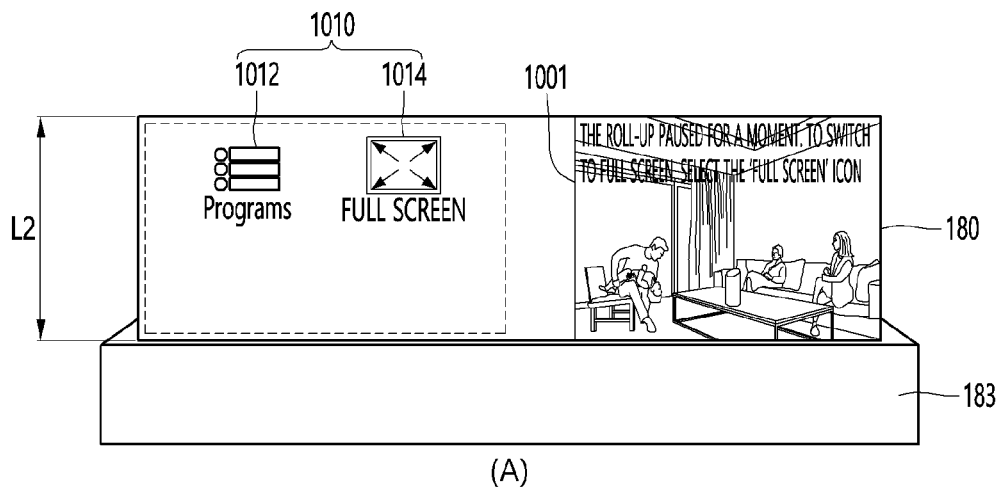
(A)
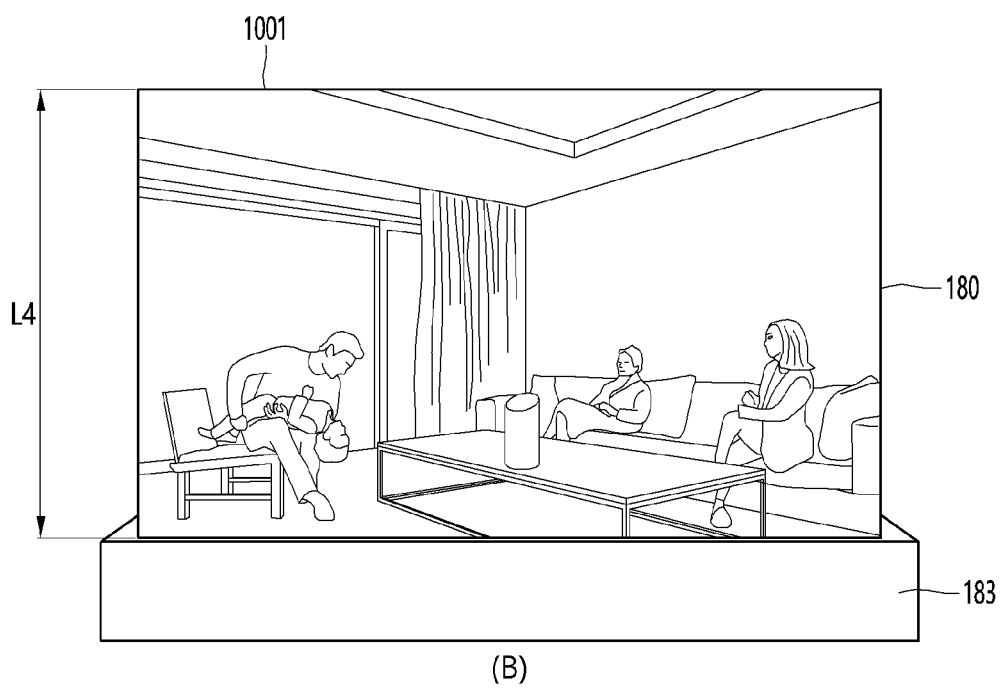
(B)

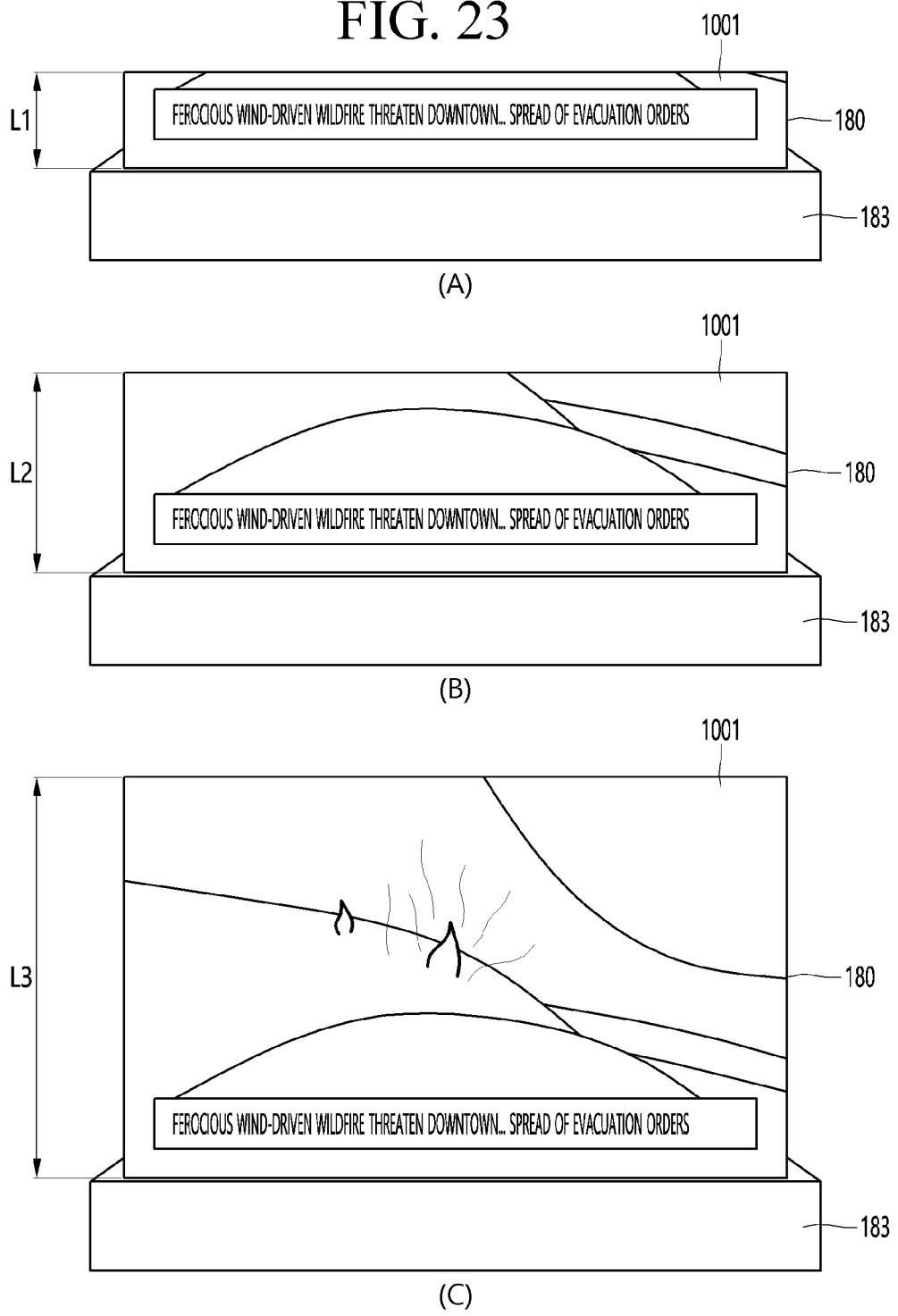

DISPLAY APPARATUS

CROSS-REFERENCE TO RELATED APPLICATION

This Application is the National Phase of PCT International Application No. PCT/KR2019/018440 filed on Dec. 26, 2019, which is hereby expressly incorporated by reference into the present application

TECHNICAL FIELD

The present disclosure relates to a display device, and more particularly, to a display device having a flexible display.

BACKGROUND ART

A display device has a function of receiving, processing, and displaying an image to be viewed by a user. For example, the display device receives a broadcast signal selected by a user among broadcast signals transmitted from a broadcasting station, separates an image signal from the received signal, and re-displays the separated image signal on a display.

Recently, by virtue of development of broadcasting technology and network technology, a function of a display device has been significantly diversified and accordingly the performance of the device has also been enhanced. That is, the display device has developed to provide various different contents as well as simply broadcast content to a user. For example, the display device can provide gameplay, listening to music, Internet shopping, user customized information, or the like using various applications as well as programs received from a broadcasting station. In order to perform such extended functions, the display device is basically connected to other devices or networks using various communication programs and provides a ubiquitous computing environment to a user. That is, the display device has evolved to a smart device for achieving connectivity to a network and ubiquitous computing.

On the other hand, in recent years, a flexible display that has enough elasticity to be greatly deformed has been developed. Such a flexible display is deformable enough to be rolled into a main body of the display apparatus. The display apparatus may include a flexible display as described above in which an area protruding to the outside of the display is changed by being rolled or unrolled in a direction guided by a roller. By using such a rollable display, the display apparatus can have a more compact structure.

Accordingly, the entire display area can be exposed to the outside to display the content or only a part of the display area can be exposed to display the content in only a partial area. On the other hand, it takes a certain time until the entire display area is exposed, and since only a part of the content is displayed when only a part of the display area is exposed, there is a problem in that a viewer cannot accurately grasp the contents of the content.

SUMMARY

An object of the present disclosure is to provide a display apparatus allowing a user to view the entire content even when the display is being extended.

An object of the present disclosure is to provide a display apparatus utilizing a remaining area other than the content when the display is being extended.

An object of the present disclosure is to provide a display apparatus minimizing interference with a user's image viewing when the display is being extended.

The display apparatus according to the embodiment of the present disclosure includes a housing, a display, a roller accommodated in the housing to rotate to roll or unroll the display and a control unit configured to control the display such that the entire content is displayed on the display extended from the housing while the display is being extended from the housing.

The control unit is configured to control the display such that the entire content is displayed while an image ratio of the content is being maintained.

The control unit is configured to control the display such that the entire content is displayed while an image size of the content increases when the display is being extended from the housing.

The display is configured to display the entire content such that an image size of the content increases while the image ratio of the content is maintained when the display is being extended from the housing.

The control unit is configured to maintain the image ratio of the content, and adjust the image size of the content to a maximum size according to the extended length of the display.

The control unit is configured to control the display such that a menu is further displayed on the display extended from the housing.

The control unit is configured to control the display such that the menu is displayed in an area other than the content in an extended area of the display which is extended from the housing.

The control unit is configured to control the display to switch content in response to an input signal instead of the content or display a sub-menu corresponding to the input signal instead of the menu when receiving the input signal for selecting any one icon in the menu.

The control unit is configured to control the display to display an image corresponding to a selection command for selecting a specific external device icon, instead of the content when the selection command is received.

The content is a broadcast image, and wherein the menu includes at least one of an application icon, a program icon, and an external device icon.

The control unit is configured to control the roller to stop the extension of the display when an input signal for selecting any one of the menu is received while the display is being extended from the housing.

The control unit is configured to control the roller such that the display is extended to a preset length when an input signal for selecting any one of the menu is received while the display is being extended from the housing is received.

The control unit is configured to control the display to display a screen indicating stop of extension of the display when the extension of the display is stopped before the display is extended to a maximum length.

The screen indicating the stop of extension of the display further includes an icon for selecting whether to extend the display to the maximum length, wherein the control unit is configured to control the roller such that the display is extended to the maximum length when the selection command for the icon is received.

The control unit is configured to control the display such that the content is displayed in a list form when the extended length of the display is less than or equal to a preset first length in a case where the content is displayed while the display is being extended from the housing.

The control unit is configured to control the display such that the content is displayed in a thumbnail form when the extended length of the display is greater than the first length and less than or equal to a second length longer than the first length in a case where the content is displayed while the display is being extended from the housing.

The control unit is configured to control the display such that the content is displayed in a full screen form when the extended length of the display is greater than the second length and less than or equal to a third length longer than the second length in a case where the content is displayed while the display is being extended from the housing.

The control unit is configured to control the display to display user preference information preferentially when displaying the content in a list form or a thumbnail form.

The control unit is configured to fix a position of a pointer is fixed on an icon when the pointer is located on any one icon in a case where an extended length of the display is increased.

The control unit is configured to fix a position of a pointer displayed on the display when the display is extended from the housing.

Advantageous Effects

According to an embodiment of the present disclosure, there is an advantage in that it is possible to provide a display apparatus allowing a user to grasp the contents of content even when the display is not fully extended. That is, there is an advantage in that it is possible to provide a display apparatus for allowing a viewer to grasp the entire contents of the content even while the display is being extended.

According to an embodiment of the present disclosure, there is an advantage in that it is possible to provide a display apparatus utilizing an area where no content is displayed while the display is being extended, and thus executing various functions as well as displaying content when the display is being extended.

According to an embodiment of the present disclosure, there is an advantage in that it is possible to provide a display apparatus allowing the viewer to focus on the content by minimizing interference with a user's image viewing when the display is being extended.

BRIEF DESCRIPTION OF THE DRAWINGS

FIGS. 15 and 16 are exemplary views illustrating a method of operating a display apparatus when the display apparatus receives an input signal for selecting a sub-menu according to an embodiment of the present disclosure.

FIG. 17 is an exemplary diagram showing a method of displaying a sub-menu in different manners according to the extended length of the display.

FIG. 18 is an exemplary diagram illustrating a method of operating a display apparatus when an input signal for switching content is a channel switch signal.

FIG. 20 is an exemplary diagram illustrating a method of receiving a maximum extension command when the extension of the display apparatus is stopped before being extended to a maximum length according to an embodiment of the present disclosure.

FIG. 23 is an exemplary diagram illustrating a method of controlling a display form of content in a display apparatus according to an embodiment of the present disclosure.

DETAILED DESCRIPTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves. In addition, in describing the embodiments disclosed herein, when it is determined that the detailed description of the related known technology may obscure the gist of the embodiments disclosed herein, the detailed description thereof will be omitted. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are generally only used to distinguish one element from another. When an element is referred to as being "connected with" another element, the element can be connected with the other element or intervening elements can also be present. In contrast, when an element is referred to as being "directly connected with" another element, there are no intervening elements present.

A singular representation can include a plural representation unless it represents a definitely different meaning from the context. It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

The display device described in this specification refers to a TV, a smart TV, a network TV, a hybrid broadcast broadband television (HBBTV), an Internet TV, a web TV, an Internet protocol television (IPTV), digital signage, a desktop computer, a smartphone, a laptop computer, a digital broadcast terminal, a personal digital assistant (PDA), a portable multimedia player (PMP), a navigation system, a slate PC, a tablet PC, an ultrabook, a wearable device, etc. Including a rollable display. Here, rollable display means that a display can be rolled in the form of a roll and can include a flexible display, a foldable display, etc.

Figure 1:
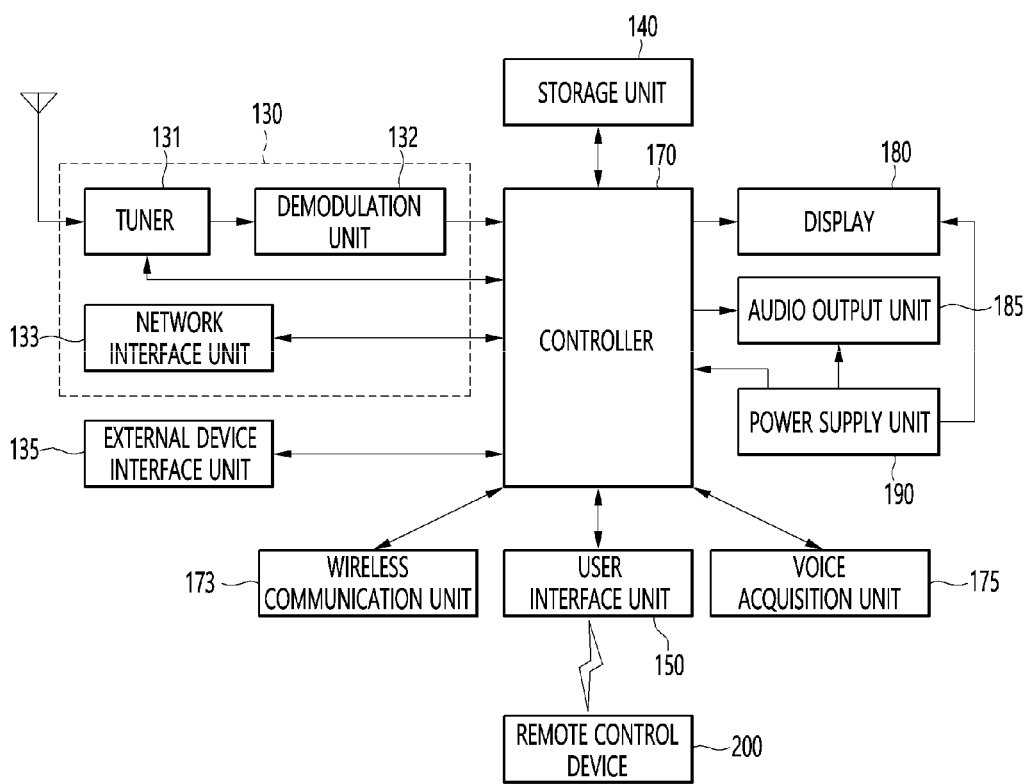
FIG. 1 is a block diagram illustrating a configuration of a display device according to an embodiment of the present disclosure.

FIG. 1 is a block diagram illustrating a configuration of a display device according to an embodiment of the present disclosure. Referring to FIG. 1, a display device 100 includes a broadcast reception unit 130, an external device interface unit 135, a storage 140, a user input interface unit 150, a controller or processor 170, a wireless communication unit 173, a voice acquisition unit 175, a display 180, an audio output unit 185, and a power supply unit 190.

The broadcast reception unit 130 can include a tuner 131, a demodulation unit 132, and a network interface unit 133. The tuner 131 can select a specific broadcast channel according to a channel selection command. The tuner 131 may receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 provides an interface for connecting the display device 100 to a wired/wireless network including internet network. The network interface unit 133 can transmit or receive data to or from another user or another electronic device through an accessed network or another network linked to the accessed network.

Additionally, some content data stored in the display apparatus 100 can be transmitted to a user or an electronic device, which is selected from other users or other electronic devices pre-registered in the display apparatus 100.

The network interface unit 133 can access a predetermined webpage through an accessed network or another network linked to the accessed network. That is, it may transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator. The network interface unit 133 can also select and receive a desired application among applications open to the air, through network. The external device interface unit 135 can receive an application or an application list in an adjacent external device and deliver it to the controller 170 or the storage 140.

The external device interface 135 can also provide a connection path between the display device 100 and an external device. The external device interface 135 can receive at least one of image and audio output from an external device that is wirelessly or wiredly connected to the display device 100 and deliver it to the controller. An external device connectable to the external device interface unit 130 may be one of a set-top box, a Blu-ray player, a DVD player, a game console, a sound bar, a smartphone, a PC, a USB Memory, and a home theater system but this is just exemplary.

The storage 140 can store signal-processed image, voice, or data signals stored by a program in order for each signal processing and control in the controller 170. Additionally, the storage 140 can perform a function for temporarily store image, voice, or data signals output from the external device interface unit 135 or the network interface unit 133 and can store information on a predetermined image through a channel memory function. The storage 140 can also store an application or an application list input from the external device interface unit 135 or the network interface unit 133. The display device 100 can play content files (for example, video files, still image files, music files, document files, application files, and so on) stored in the storage 140 and provide them to a user.

The user input interface unit 150 can deliver signals input from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals input from local keys (not shown) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface unit 135.

Voice signals processed in the controller 170 can be output to the audio output unit 185. Additionally, voice signals processed in the controller 170 can be input to an external output device through the external device interface unit 135. Besides that, the control module 170 can control overall operations in the display device 100. Additionally, the controller 170 can control the display device 100 by a user command or internal program input through the user input interface unit 150 and download a desired application or application list into the display device 100 in access to network.

The controller 170 may output channel information selected by a user together with processed image or voice signals through the display 180 or the audio output unit 185. Additionally, according to an external device image playback command received through the user input interface unit 150, the controller 170 can output image signals or voice signals of an external device such as a camera or a camcorder, which are input through the external device interface unit 135, through the display 180 or the audio output unit 185.

Further, the controller 170 can control the display 180 to display images and control broadcast images input through the tuner 131, external input images input through the external device interface unit 135, images input through the network interface unit, or images stored in the storage 140 to be displayed on the display 180. In this instance, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files. Further, the wireless communication unit 173 can perform a wired or wireless communication with an external electronic device.

The communication unit 173 may communicate with an external device through wired or wireless communication. The communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The communication unit 173 can support wireless communication between the display device 100 and a wireless communication system, between the display device 100 and another display device 100, or between networks including the display device 100 and another display device 100 (or an external server) through wireless area networks. The local area networks may be wireless personal area networks).

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface unit 135, into R, G, and B signals to generate driving signals. The display 180 may be a rollable display.

Figure 7:
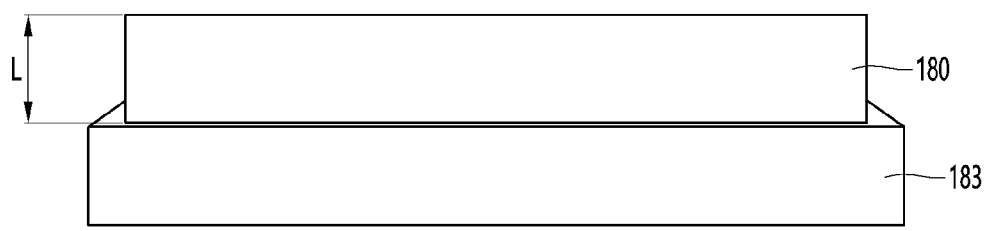
FIG. 7 is a view illustrating an appearance of the display device when a mode of the display is the partial view mode according to an embodiment of the present disclosure.

The rollable display may be retracted into the housing 183 (see FIG. 7) and rolled onto a roller 184 (see FIG. 7), or extended out of a housing 183 (see FIG. 7) and unrolled from the roller 184 (see FIG. 7). The display apparatus 100 may include a rollable display, and an area in which content is displayed may be increased or decreased according to extension or retraction of the rollable display.

Hereinafter, the display 180 to be described below may refer to a rollable display. Furthermore, the display device 100 shown in FIG. 1 is just one embodiment of the present disclosure and thus, some of the components shown can be integrated, added, or omitted according to the specification of the actually implemented display device 100.

That is, if needed, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132. For example, the display device 100 can be divided into an image processing device such as a set-top box for receiving broadcast signals or contents according to various network services and a content playback device for playing contents input from the image processing device.

In this instance, an operating method of a display device according to an embodiment of the present disclosure described below can be performed by one of the display device described with reference to FIG. 1, an image processing device such as the separated set-top box, and a content playback device including the display 180 and the audio output unit 185. The audio output unit 185 receives the audio processed signal from the controller 170 and outputs the sound.

Figure 2:
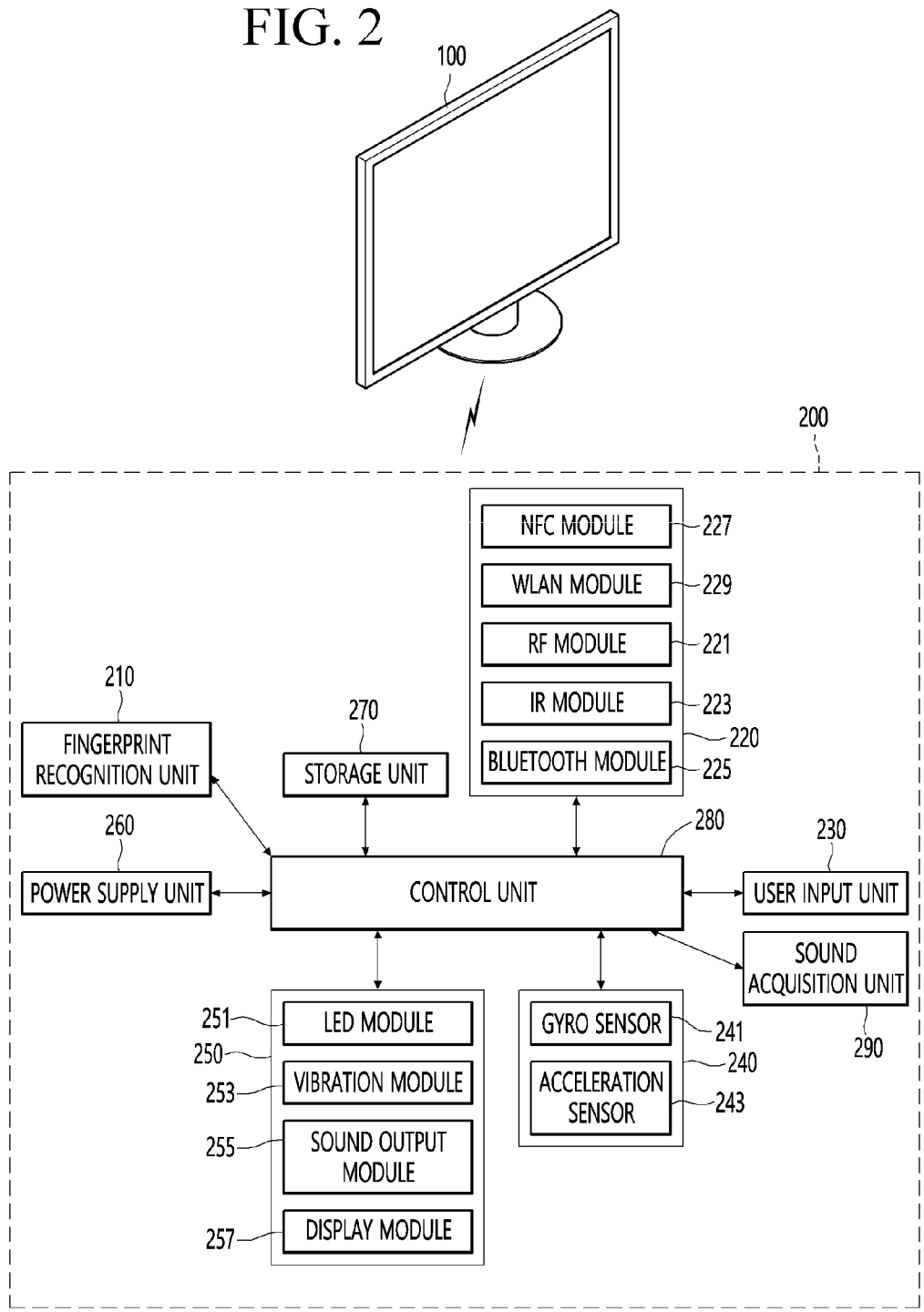
FIG. 2 is a block diagram illustrating a remote control device according to an embodiment of the present disclosure.
Figure 3:
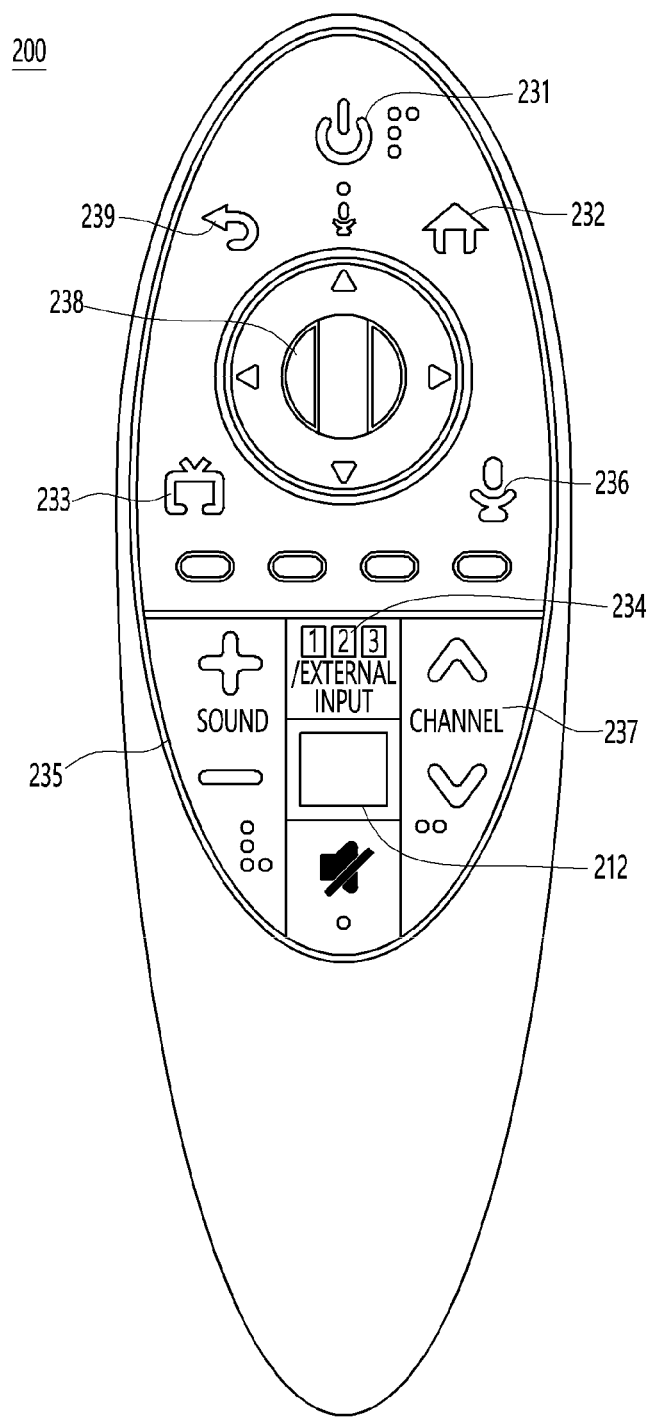
FIG. 3 is a view illustrating an actual configuration of a remote control device according to an embodiment of the present disclosure.

Next, referring to FIGS. 2 and 3, a remote control device is described according to an embodiment of the present disclosure. FIG. 2 is a block diagram illustrating a remote control device according to an embodiment of the present disclosure, and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 225 transmits/receives signals to/from an arbitrary any one of display devices according to the above-mentioned embodiments of the present disclosure. The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220. Further, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. Thus, a user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The power button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving a user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described. If the user input unit 230 includes a touch screen, a user can touch a soft key of the touch screen to input a command relating to the display device 100 to the remote control device 200. Additionally, the user input unit 230 can include various kinds of input mechanisms manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200. For example, the gyro sensor 241 can sense information on an operation of the remote control device 200 based on x, y, and z axes and the acceleration sensor 243 can sense information on a movement speed of the remote control device 200. Further, the remote control device 200 can further include a distance measurement sensor and sense a distance with respect to the display 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it. The controller 280 controls general matters relating to a control of the remote control device 200. The controller 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice. The voice acquisition unit 290 can include at least one microphone 291 and obtain voice through the microphone 291.

Figure 4:
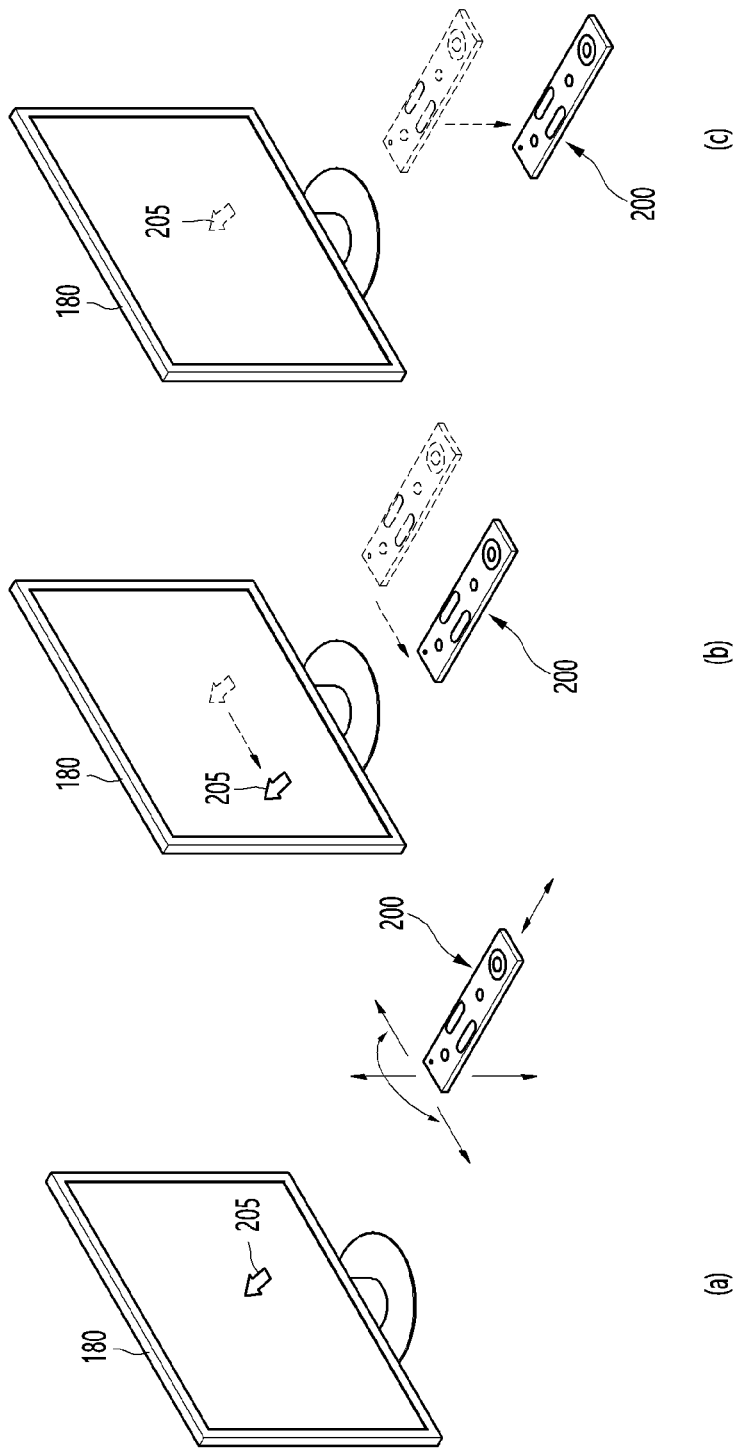
FIG. 4 is a view of utilizing a remote control device according to an embodiment of the present disclosure.

Next, FIG. 4 is described. FIG. 4 is a view of utilizing a remote control device according to an embodiment of the present disclosure. In particular, FIG. 4(*a*) illustrates that a pointer 205 corresponding to the remote control device 200 is displayed on the display 180.

In addition, a user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed largely. On the contrary, if a user moves the remote control device 200 close to the display 180, a selection area in the display 180 corresponding to the pointer 205 can be zoomed out and displayed reduced.

If the remote control device 200 is away from the display 180, a selection area can be zoomed out and if the remote control device 200 is close to the display 180, a selection area can be zoomed in. Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Further, the moving speed or moving direction of the pointer 205 can correspond to the moving speed or moving direction of the remote control device 200. In addition, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
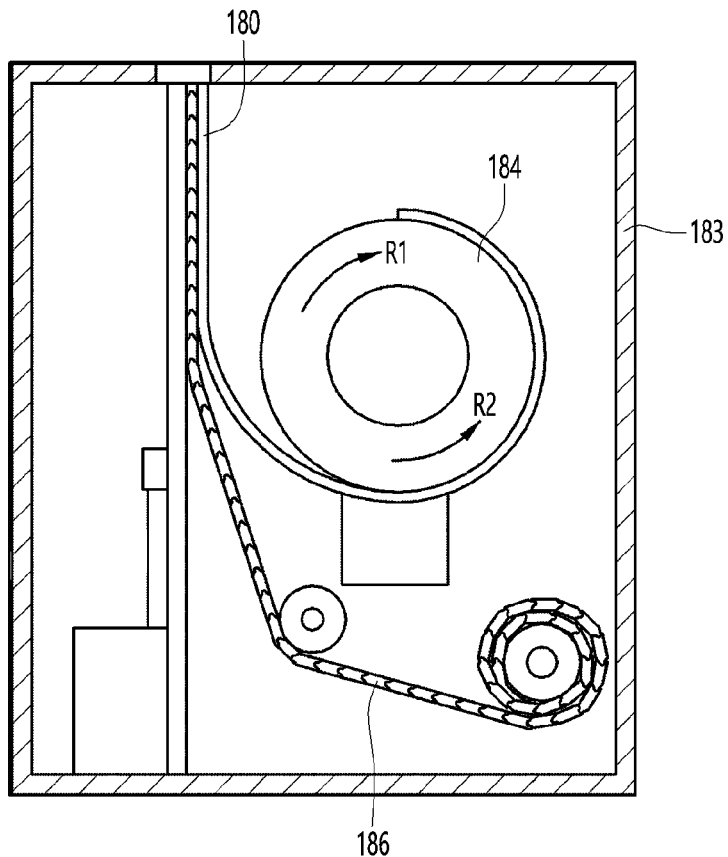
FIG. 5 is a cross-sectional view illustrating an internal part of a housing of a display device 100 according to the present disclosure.

Next, FIG. 5 is a cross-sectional view illustrating an internal part of a housing of a display device 100 according to the present disclosure. As shown, the display device 100 can include a housing 183, a display 180 drawn into or out from the housing 183, and a roller 184 that guides the display 180 to be wound or unwound.

The roller 184 can be received in the housing 183. The roller 184 can be a rotatable guide bar. The roller 184 may be rotatable such that the display 180 is wound or unwound. For example, as shown in FIG. 5, when the roller 184 rotates in the R1 direction, the display 180 can be drawn out from the housing 183. In contrast, when the roller 184 rotates in the R2 direction, the display 180 can be drawn into the housing 183, while being wound around the roller 184. Also, the display 180 may be extended or retracted in the left and right directions according to the arrangement of the housing.

The display 180 can be drawn out from the housing 183 or can be drawn into the housing 183 according to rotation of the roller 184. The controller 170 can control the display 180 to display content in an area of the display 180 drawn out from the housing 183. According to an embodiment, the display device 100 can further include a cover 186. The cover 186 may be disposed in the housing 183 and protecting the display 180 drawn in the housing 183.

As such, as the display 180 is drawn out from or drawn into the housing 183, the area where content is displayed can increase or decrease. That is, the display area of the content of the display 180 varies as the display 180 is drawn out or drawn in.

Figure 6:
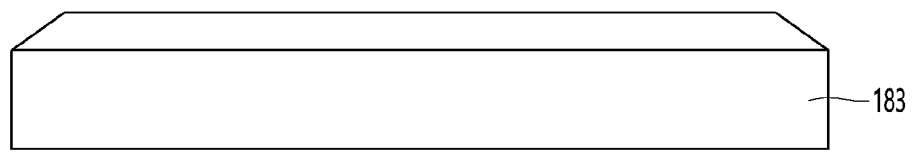
FIG. 6 is a view illustrating an appearance of the display device when a mode of the display is the zero view mode according to an embodiment of the present disclosure.
Figure 8:
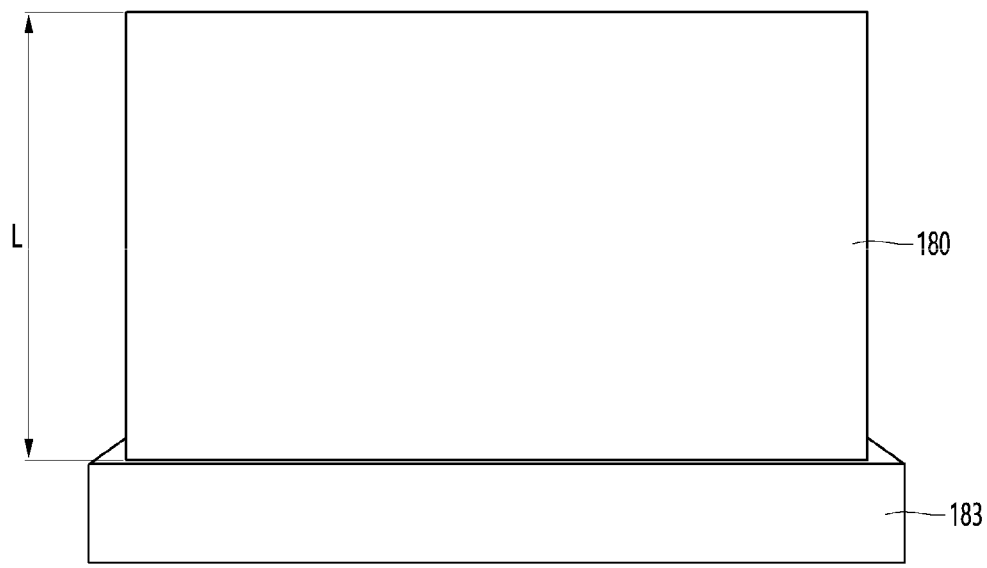
FIG. 8 is a view illustrating an appearance of the display device when a mode of the display is the full view mode according to embodiments of the present disclosure.

Next, an extended length of the display 180 according to an operation mode of the display apparatus 100 will be described with reference to FIGS. 6 to 8. FIG. 6 is a view illustrating an appearance of the display device when a mode of the display is the zero view mode according to an embodiment of the present disclosure, FIG. 7 is a view illustrating an appearance of the display device when a mode of the display is the partial view mode according to an embodiment of the present disclosure, and FIG. 8 is a view illustrating an appearance of the display device when a mode of the display is the full view mode according to embodiments of the present disclosure.

Meanwhile, terms used in the present disclosure, for example, "zero view mode," "partial view mode" and "full view mode" are merely examples for convenience of description, and thus these terms can be modified. Therefore, the present disclosure is not limited thereto.

The zero view mode is a mode in which the display 180 operates in a state in which the display 180 is entirely drawn in the housing 183. For example, when operating in a speaker mode, the display device 100 can control the mode of the display to be in the zero view mode.

When the display 180 is in the zero view mode, the display 180 does not display content in the entire area of the display 180. The display 180 can also be turned off in the zero view mode. The partial view mode is a mode in which the display 180 operates in a state of being partially drawn out from the housing 183. For example, when the display device 100 operates in a menu mode, a mood mode, a music mode, a frame mode, or a clock mode, the mode of the display can be controlled in the partial view mode.

When the display 180 is in the partial view mode, the display 180 can display content only in an area of the display 180 drawn out from the housing 183. That is, in the partial view mode, the content is not displayed in an area of the display 180 drawn in the housing 183.

The full view mode is a mode in which the display 180 operates in a state of being maximally drawn out from the housing 183. That is, the full view mode is a mode in which a length of the display 180 drawn out from the housing 183 is a maximum. For example, when the display device 100 operates in a normal mode, the display can be controlled in the full view mode, and here, the normal mode can be a mode in which a broadcast image, an input image from the external device interface unit 135, and the like is output.

When the display 180 is in the full view mode, content can be displayed in an area of the display 180 drawn from the housing 183. In the full view mode, the display 180 can display content in the entire area of the display 180 available for outputting an image.

According to an embodiment of the present disclosure, the display apparatus 100 may include a housing 183 and a display 180 extendable from and retractable into the housing 183, and may be installed in a such a way that the housing 183 is seated on the floor as shown in FIG. 7.

In this instance, the display 180 may be elongated in an upward direction when the display unit 180 is extended from the housing 183. For example, when the display 180 is extended as shown in FIG. 7, content may be displayed on the extended area of the display 180. Further, when the display 180 is additionally extended from the housing 183 as shown in FIG. 8, content may be displayed on the entire extended areas. The extended length L of the display 180 may be variable.

According to another embodiment, the display apparatus 100 may include a housing 183 and a display 180 extendable from and retractable into the housing 183, and may be installed in a such a way that the housing 183 is fixed to a wall or the like.

In this instance, the display 180 may be elongated in a left or right direction when the display unit 180 is extended from the housing 183. Meanwhile, the display apparatus 100 is not limited to the examples described above, and may be installed in various forms. For example, the display apparatus 100 may be installed in such a way that the housing 183 is fixed to the ceiling. As described with reference to FIGS. 6 to 8, the display area of the content may be changed according to the extended length L of the display 180.

In the display 100 according to an embodiment of the present disclosure, when the power is turned off, the display 180 may be controlled in a zero-view mode, and when the power is turned on, the display 180 may be controlled in a partial-view mode or a full-view mode. When the display 180 is fully retracted into the housing 183 and then starts to be extended from the housing 183 according to a power-on command, the content is displayed while a part is being cut until the display 180 is completely extended, so that a user may need to wait a predetermined time to view the entire content.

In addition, when content is displayed while the display 180 is being extended from the housing 183, the entire content is not displayed until the display 180 is fully extended, so that there is a problem in that a viewer cannot accurately understand the content. According to an embodiment of the present disclosure, an object of the present disclosure is to provide a display apparatus 100 for allowing a user to grasp the contents of content even when the display 180 is not extended fully.

Figure 9:
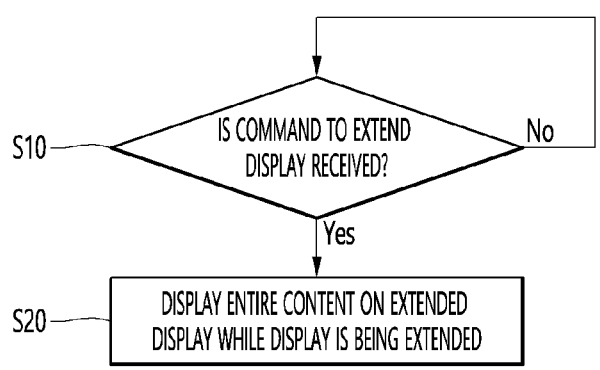
FIG. 9 is a flowchart showing a method of operating a display apparatus according to an embodiment of the present disclosure.

FIG. 9 is a flowchart showing a method of operating a display apparatus according to an embodiment of the present disclosure. The controller 170 can receive a command to extend the display 180 (S10).

The command to extend the display 180 may be a command to extend the display 180 from the housing 183 or to increase the length of the display 180 extended from the housing 183. For example, the controller 170 can recognize, as the command to extend the display 180, a command that requires additional extension of the display 180, such as a power-on command, a command to enter the partial-view mode from the zero-view mode, and a command to enter the full-view mode from the partial-view mode.

When the controller 170 receives the command to extend the display 180, the controller 170 can display the entire content 1001 (see FIG. 10) on the extended display 180 while the display 180 is being extended (S20). The content 1001 (see FIG. 10) includes an image displayable on a screen through the display 180.

The content 1001 may be a broadcast image received by the controller 170 through the broadcast receiving unit 130, an external device image received by the controller 170 through the external device interface unit 135, or an image stored in the storage unit 140. This is only an example, and the content 1001 includes any content that can be displayed on the display 180, such as pictures, photos, images, and applications.

The controller 170 can reduce the size of the content 1001 such that the entire content 1001 is displayed on the extended display 180 while the display 180 is being extended.

According to an embodiment, the controller 170 can control the display 180 such that the image size of the content 1001 increases while the image ratio of the content 1001 is being maintained when the display 180 is being extended. The image ratio being maintained includes that the horizontal-vertical ratio of the image is kept constant, and the image size increasing includes that the size of the image also increases as the area of the extended display 180 increases. In this instance, the size of the image can increase in proportion to the extent to which the display 180 is extended, but it does not mean only that the image size increases proportionally.

Specifically, a method of displaying the entire content 1001 in the display 180 according to an embodiment of the present disclosure will be described with reference to FIG. 10. In particular, FIG. 10 is an exemplary diagram showing an example of a method of displaying entire content in a display apparatus according to an embodiment of the present disclosure.

Figure 10:
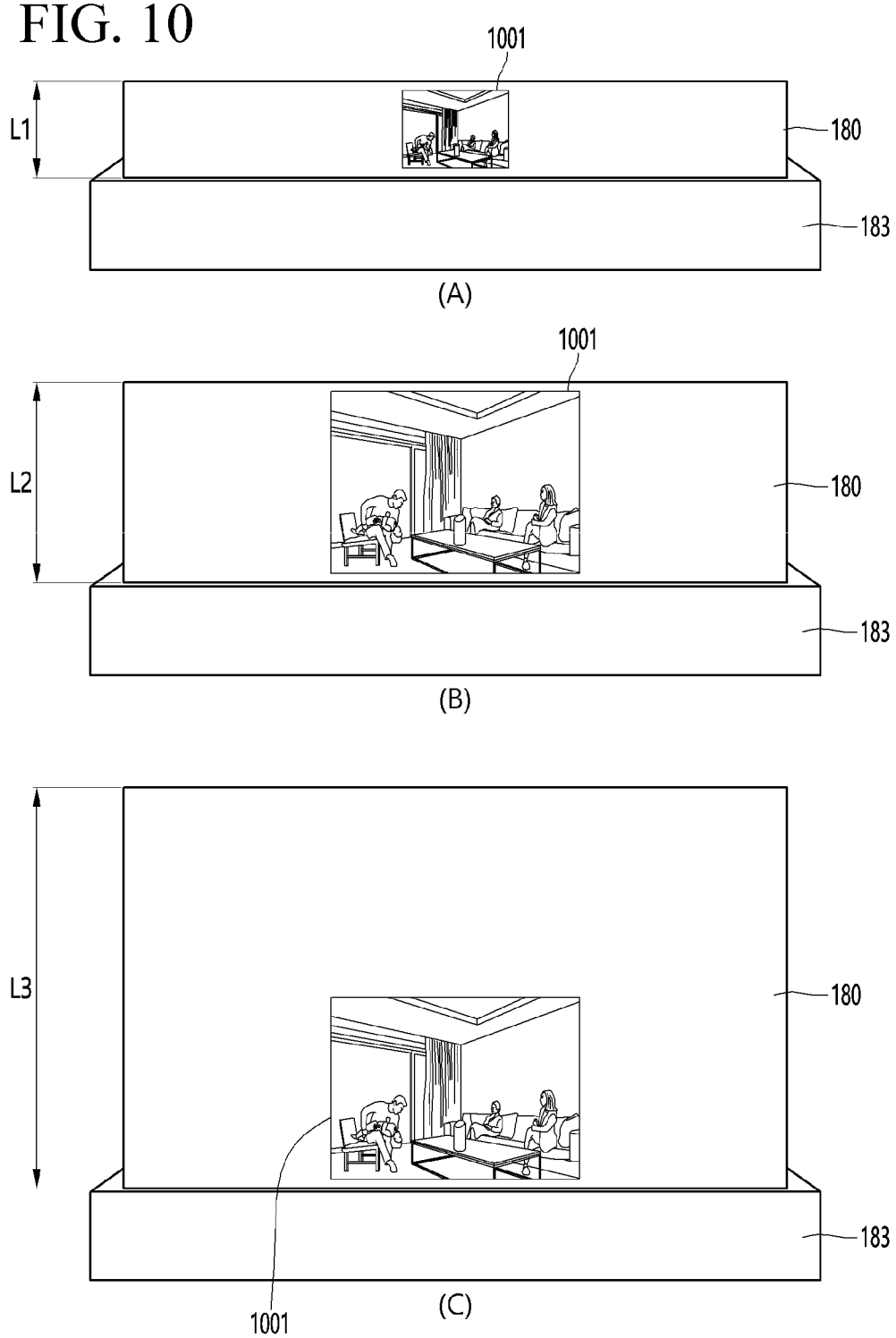
FIG. 10 is an exemplary diagram showing an example of a method of displaying entire content in a display apparatus according to an embodiment of the present disclosure.

According to an embodiment of the present disclosure, when a part of the display 180 is extended by L1 as shown in (A) of FIG. 10, the controller 170 controls the display 180 such that the entire content 1001 is displayed in a reduced size. According to an embodiment, as shown in (B) of FIG. 10, the controller 170 controls the display 180 such that the image size of the content 1001 is increasing gradually while the image ratio of the content 1001 is maintained when the display 180 is being extended by L2. In this instance, the image ratio of the displayed content 1001 in a state in which the display 180 is extended by L1 may be identical to the image ratio of the displayed content 1001 in a state in which the display 180 is extended by L2, and the image size of the content 1001 displayed in a state in which the display 180 is extended by L1 may be smaller than the image size of the content 1001 displayed in a state in which the display 180 is extended by L2.

On the other hand, as shown in (C) of FIG. 10, the controller 170 controls the display 180 such that the image ratio of the content 1001 is maintained and the image size of the content 1001 is displayed as in (B) of FIG. 10 while the display 180 is being extended by L3. In this instance, the controller 170 can further display a menu 1010 (see FIG. 22) in a remaining area, which will be described with reference to FIG. 22.

According to another embodiment, unlike the example of FIG. 10, the controller 170 can adjust the size of the content 1001 such that the entire content 1001 is displayed on the display 180 regardless of the image ratio of the content 1001 and display the content 1001 on the display 180. That is, the method of displaying the content 1001 is not limited to the example shown in FIG. 10.

Next, another example of a method of displaying the entire content 1001 in a display apparatus according to an embodiment of the present disclosure will be described with reference to FIG. 11. In particular, FIG. 11 is another exemplary diagram showing an example of a method of displaying entire content in a display apparatus according to an embodiment of the present disclosure.

Figure 11:
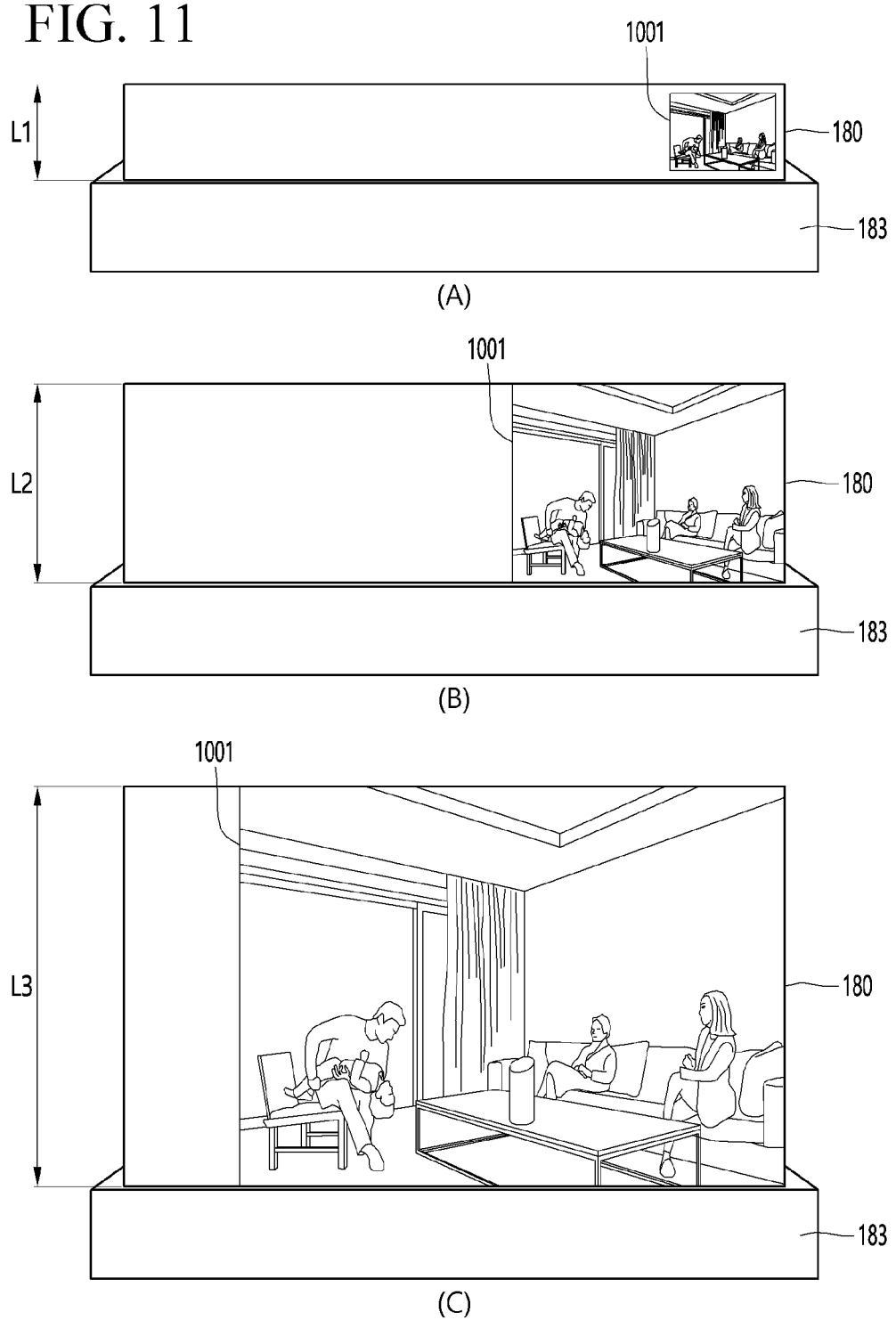
FIG. 11 is another exemplary diagram showing an example of a method of displaying entire content in a display apparatus according to an embodiment of the present disclosure.

Referring to the example of FIG. 11, the controller 170 increases the size of the content 1001 based on the extended length of the display 180 when increasing the size of the content 1001. For example, as shown in (A) and (B) of FIG. 11, the controller 170 controls the display 180 to display the content 1001 such that the image size of the content 1001 increases to the maximum size according to the extended length of the display 180 while the image ratio of the content 1001 is maintained when the extended length of the display 180 increases from L1 to L2. In addition, as shown in (C) of FIG. 11, the controller 170 can control the display 180 to display the content 1001 such that the image size of the content 1001 increases to the maximum size according to L3 while the extended length of the display 180 increases by L3.

According to the embodiment, an image of the maximum size that can be displayed through the display 180 may be provided while the image ratio is maintained when the display 180 is being extended. Meanwhile, the display apparatus 100 according to an embodiment of the present disclosure can change a method or scheme of displaying the content 1001 according to the extended length of the display 180.

Next, a method of displaying the content 1001 according to the extended length in the display apparatus 100 according to an embodiment of the present disclosure will be described with reference to FIG. 12. In particular, FIG. 12 is an exemplary view illustrating a method for displaying content in a display apparatus according to an embodiment of the present disclosure.

When the extended length L1 of the display 180 is less than or equal to a preset first length in which the display 180 displays the content 1001, the controller 170 can control the display 180 such that the content 1001 is displayed in the form of a list. For example, in (A) of FIG. 12, the controller 170 can convert the content 1001 into text information, and control the display 180 to display text information in the form of a list. In this instance, the controller 170 can convert the content 1001 into text information by itself and display text information in the form of a list, or can receive text information and display the text information in the form of a list. As the extended length L of the display 180 increases, items may be added to the list. For example, two items of the list displayed as the content 1001 can be displayed as shown in (A) of FIG. 12, and then the number of items in the list can increase to three or more according to the extension of the display 180.

Figure 12:
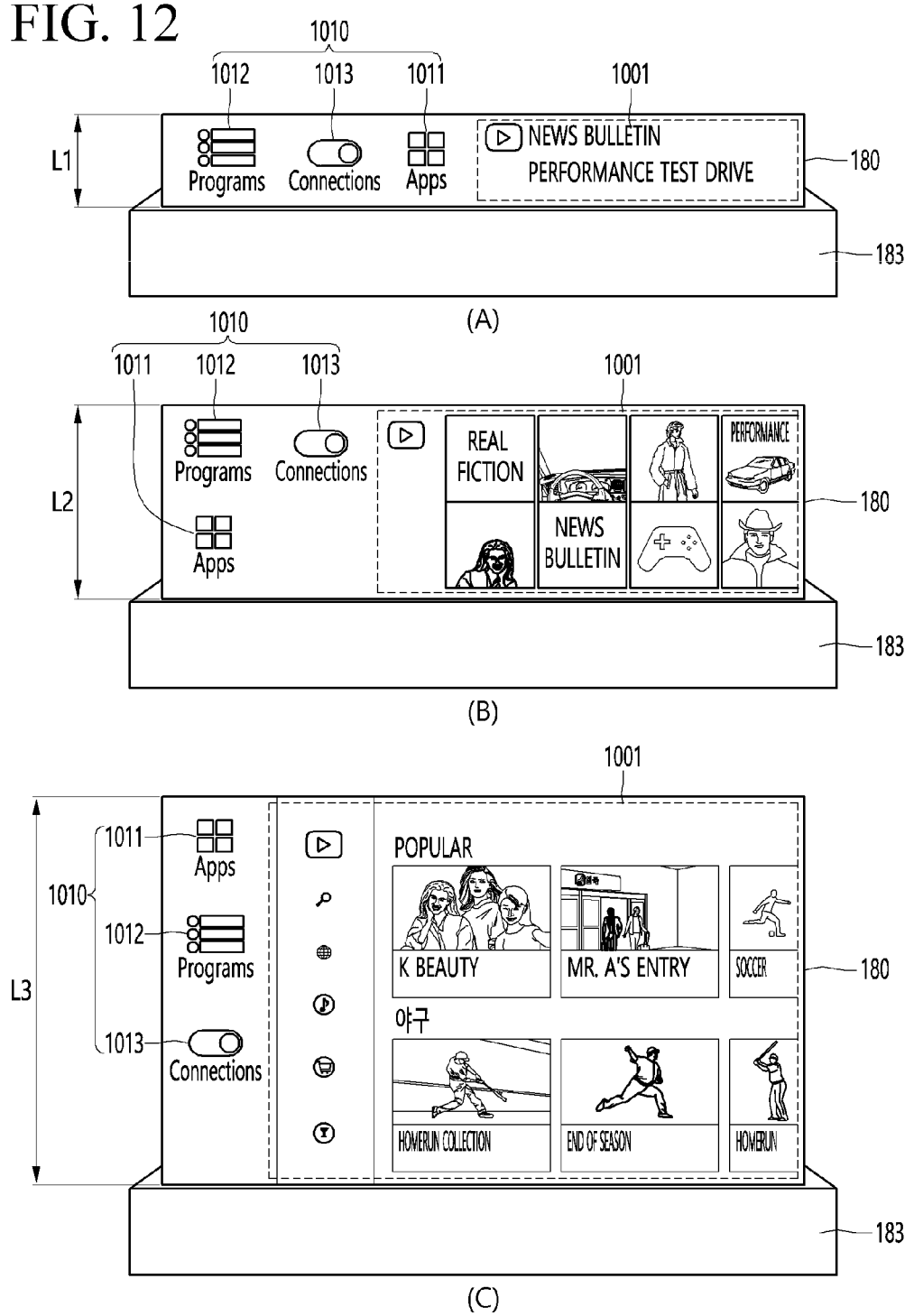
FIG. 12 is an exemplary view illustrating a method for displaying content in a display apparatus according to an embodiment of the present disclosure.

In addition, as shown in (B) of FIG. 12, when the extended length L2 of the display 180 is greater than a preset first length and less than or equal to a second length longer than the first length, the controller 170 can control the display 180 to display the content 1001 in the form of a thumbnail. For example, as shown in (B) of FIG. 12, the controller 170 can control the display 180 to display the content 1001 in the form of a thumbnail.

Next, when the extended length L3 of the display 180 is greater than a preset second length and less than or equal to a third length longer than the second length, the controller 170 can control the display 180 to display the content 1001 in a full screen form. For example, as shown in (C) of FIG. 12, the controller 170 can control the display 180 to display the content 1001 provided by an application in a full screen form. In this instance, the full screen form may mean a basic display form of the content 1001.

Also, when the content 1001 is displayed in the form of a list or thumbnail, the controller 170 can control the display 180 to preferentially display user preference information. For example, when the controller 170 displays the content 1001 in the form of a list as shown in (A) of FIG. 12, the controller 170 can may control the display 180 to display the user preference information first and further display posterior information according to the extension of the display 180.

In the above-described embodiment, the controller 170 can control the size and image ratio of the content 1001 such that the entire content 1001 is displayed until the display 180 is extended to a target length according to a command to extend the display 180. In this instance, the target length may vary depending on the type of the command to extend the display 180.

The display apparatus 100 according to an embodiment of the present disclosure may further display a menu 1010 on the extended display 180 while the display 180 is being extended. That is, the display apparatus 100 may display the content 1001 and the menu 1010 together while the display 180 is being extended.

The menu 1010 includes an icon or a collection of icons for receiving a control command of the display apparatus 100. For example, the menu 1010 may include icons for allowing a user to select information to be displayed on the display 180 such as an application icon 1011, a program icon 1012, and an external device icon 1013. In addition, the menu 1010 may include an application providing information such as a clock application or a weather application.

Figure 13:
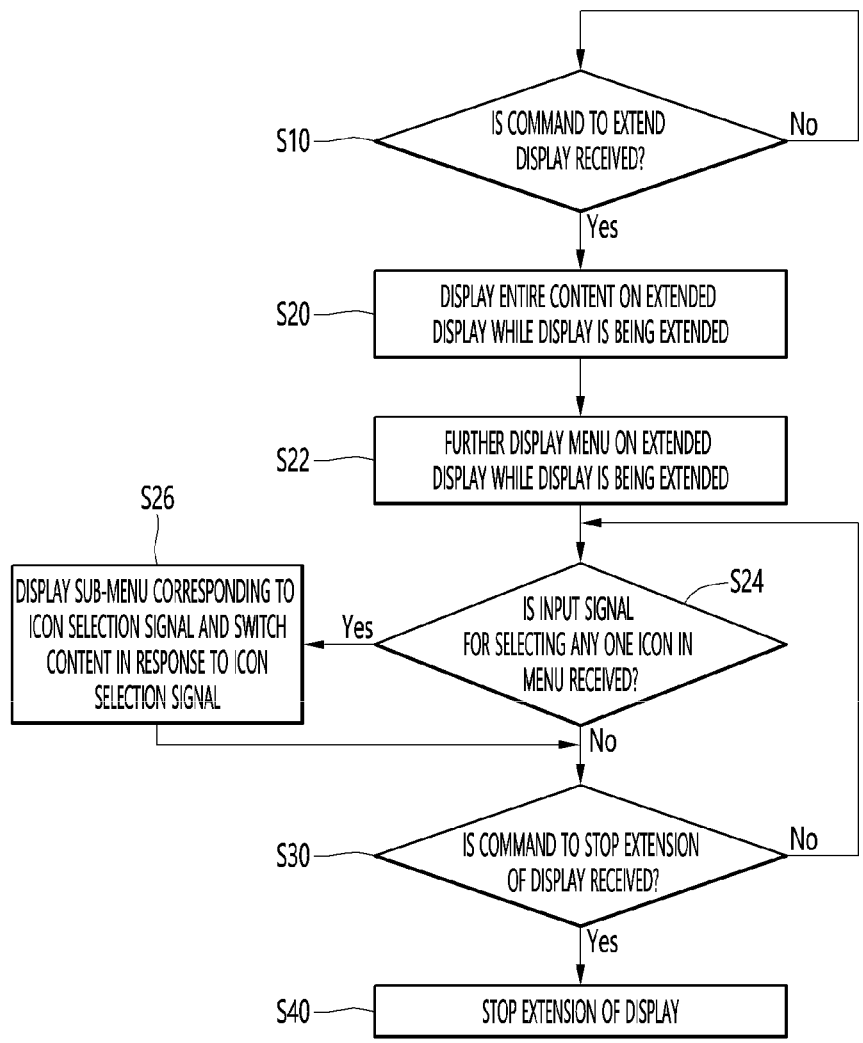
FIG. 13 is a flowchart illustrating a method for displaying content and a menu together in a display apparatus according to an embodiment of the present disclosure.

Next, a method of further displaying the menu 1010 on the extended display 180 in the display apparatus 100 according to an embodiment of the present disclosure will be described with reference to FIG. 13. In particular, FIG. 13 is a flowchart illustrating a method for displaying content and a menu together in a display apparatus according to an embodiment of the present disclosure.

The controller 170 can receive a command to extend the display 180 (S10). When the controller 170 receives the command to extend the display 180, the controller 170 can display the entire content 1001 on the extended display 180 while the display 180 is being extended (S20). Steps S10 and S20 are the same as those described with reference to FIG. 9, and thus redundant descriptions will be omitted.

The control unit 100 may further display a menu 1010 on the extended display 180 while the display 180 is being extended (S22). The controller 170 can control the display 180 such that the menu 1010 is displayed in an area other than the content 1001, or the menu 1010 is displayed in an overlapping manner on the content 1001.

Figure 14:
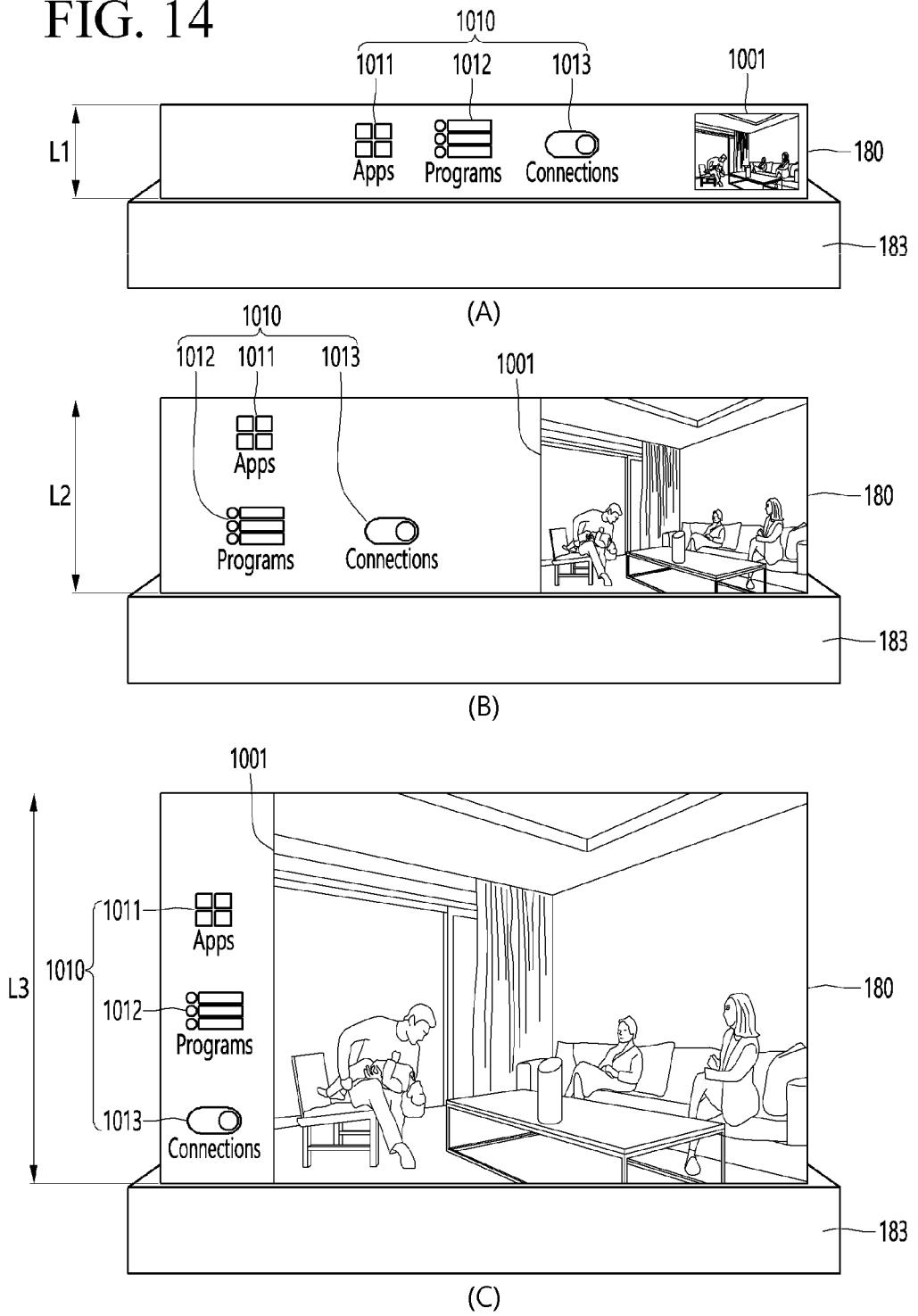
FIG. 14 is an exemplary view illustrating a method for further displaying a menu in a display apparatus according to an embodiment of the present disclosure.

Next, a method of further displaying the menu 1001 in the display apparatus 100 according to an embodiment of the present disclosure will be described with reference to FIG. 14. In particular, FIG. 14 is an exemplary view illustrating a method for further displaying a menu in a display apparatus according to an embodiment of the present disclosure.

The controller 170 can control the display 180 such that the menu 1010 is displayed together with the content 1001 of a first size when the display 180 is extended by L1 as shown in FIG. 14(A), control the display 180 such that the menu 1010 is displayed together with the content 1001 of a second size when the display 180 is extended by L2 as shown in FIG. 14(B), and control the display 180 such that the menu 1010 is displayed together with the content 1001 of a third size when the display 180 is extended by L3 as shown in FIG. 14(C).

In this instance, the first size may be smaller than the second size, and the second size may be smaller than the third size. In addition, the vertical length of the first size may be equal to L1 which is the extended length of the display 180, or smaller than L1 by a predetermined size, the vertical length of the second size may be equal to L2 which is the extended length of the display 180, or smaller than L2 by a predetermined size, and the vertical length of the third size is equal to L3 which is the extended length of the display 180, or smaller than L3 by a predetermined size.

In the example of FIG. 14(A), the controller 170 can display the menu 1010 in an area other than the content 1001 of the first size in the extended display 180. In the example of FIG. 14(B), the controller 170 can display the menu 1010 in an area other than the content 1001 of the second size in the extended display 180. In the example of FIG. 14(C), the controller 170 can display the menu 1010 in an area other than the content 1001 of the third size in the extended display 180. Accordingly, the controller 170 can control the display 180 such that the menu 1010 is displayed while a display position or arrangement method of the menu 1010, the number or size of the icons, or the like is being changed as the size of the content 1001 changes.

In this way, the controller 170 can control display 180 such that the display form of the menu 1010 is changed in an area other than the content 1001 while increasing the size of the content 1001 according to the extended length of the display 180, when the display 180 is being extended.

As described above, when the menu 1010 is displayed on the remaining area of the display 180 as the size of the content 1001 increases, it is possible to provide information using an empty space that may occur as the image ratio of the content 1001 is maintained.

Referring again to FIG. 13, the controller 170 can receive an input signal for selecting any one icon in the menu 1010 (S24). Any one icon in the menu 1010 means one of the icons for which the user selects information to be displayed through the display 180, such as the application icon 1011, the program icon 1012, and the external device icon 1013.

When the controller 170 receives an input signal for selecting any one icon in the menu 1010 (S24), the controller 170 can control the display 180 such that the display 180 switches to and displays a sub-menu 1020 corresponding to a received icon selection signal or the content 1001 corresponding to the received icon selection signal.

Hereinafter, an input signal for selecting any one icon in a menu is referred to as an icon selection signal. The icon selection signal may be an input signal for controlling the sub-menu 1020 to be displayed according to the type of a selected icon, or an input signal for controlling the content 1001 being displayed to be changed.

First, a method of operating the display apparatus 100 when the icon selection signal is an input signal for controlling the sub-menu 1020 to be displayed will be described. The sub-menu 1020 may mean a collection of icons for receiving an additional input signal when the additional input signal is required to control the display apparatus 100 as a result of receiving the icon selection signal.

For example, the sub-menu 1020 of the application icon 1011 is a collection of application icons that can be currently executed on the display apparatus 100 among applications, such as a video sharing application icon 1021 and a TV replay application icon 1022 and the like.

The sub-menu 1020 of the program icon 1012 may mean a collection of icons that provide program information and additional channel information, such as a channel information icon 1023 or a channel list icon 1024. The sub-menu 1020 of the external device icon 1013 may mean a collection of external device icons connected to the display apparatus 100, such as an HDMI icon 1025, a smartphone icon 1026, and the like. However, the above-described sub-menus 1020 are merely exemplary, and there are various sub-menus according to the types of icons.

When the icon selection signal is an input signal for controlling the sub-menu 1020 to be displayed, the controller 170 can control the display 180 to display the sub-menu 1020 instead of the currently displayed menu 1010 (S26). Also, the controller 170 can control the display 180 to display the sub-menu 1020 of the selected icon while displaying the currently displayed menu 1010 as it is.

Next, a method of operating the display apparatus when the icon selection signal is an input signal for controlling the sub-menu 1020 to be displayed will be described with reference to FIGS. 15 and 16. In particular, FIGS. 15 and 16 are exemplary views illustrating a method of operating a display apparatus when the display apparatus receives an input signal for selecting a sub-menu according to an embodiment of the present disclosure.

Figure 15:
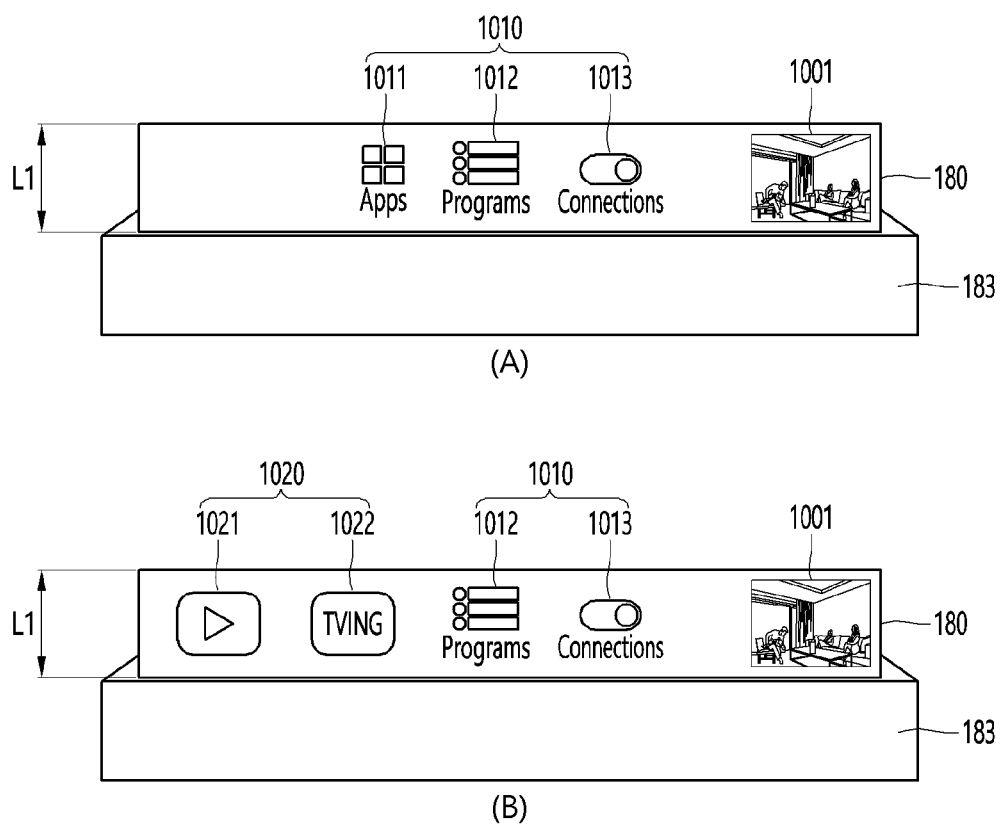

When the controller 170 receives an input signal for selecting the application icon 1011 as shown in (A) of FIG. 15, the controller 170 can determine whether there is a sub-menu 1020 of the application icon 1011. When there is the sub-menu 1020 of the application icon 1011, the controller 170 can control the display 180 to display a video sharing application icon 1021 and a TV replay application icon 1022, which are the sub-menus 1020 of the application icon 1011 as shown in (B) of FIG. 15. In this instance, the controller 170 can display the program icon 1012 and the external device icon 1013 among the menu 1010 being displayed as they are. The video sharing application icon 1021 and the TV replay application icon 1022, which are sub-menus 1020 of the application icon 1011, are merely examples, and sub-menus 1020 of the application icon 1011 may be changed according to the type of application that can be executed on the display apparatus 100.

Furthermore, when the controller 170 receives an input signal for selecting the program icon 1012 as shown in (A) of FIG. 16, the controller 170 can determine whether there is a sub-menu 1020 of the program icon 1011. When there is the sub-menu 1020 of the program icon 1012, the controller 170 can control the display 180 to display the channel list icon 1024, which is the sub-menu 1020 of the program icon 1012, as shown in (B) of FIG. 16.

That is, according to an embodiment, when displaying the sub-menu 1020 of the selected icon, the controller 170 can control display 180 such that the remaining unselected icons are displayed as they are, as in the example of FIG. 15, or the remaining unselected icons are not displayed as in the example of FIG. 16.

As described above, the method of displaying the sub-menu 1020 in the display apparatus 100 according to an embodiment of the present disclosure may be different for each icon. Also, the method of displaying the sub-menu 1020 in the display apparatus 100 according to an embodiment of the present disclosure may be different depending on the extended length of the display 180.

Next, a method of displaying the sub-menu 1020 in different manners according to the extended length of the display 180 in the display apparatus 100 according to an embodiment of the present disclosure will be described with reference to FIG. 17. In particular, FIG. 17 is an exemplary diagram showing a method of displaying a sub-menu in different manners according to the extended length of the display. For example, as shown in (A) of FIG. 17, when the extended length of the display 180 is L1, and L1 is less than or equal to a preset length, the sub-menu 1020 of the program icon 1012 may be a channel information icon 1023. That is, when the controller 170 receives a command to select the program icon 1012 while the extended length of the display 180 is less than or equal to a preset length, the controller 170 can display the channel information icon 1023 as the sub-menu 1020 of the program icon 1012. The channel information icon 1023 may mean display of information related to a program, such as channel information, broadcaster information, a broadcast program name, and a broadcast time of the content 1001 being displayed on the display 180.

On the other hand, as shown in (B) of FIG. 17, when the extended length of the display 180 is L2, and L2 is greater than the preset length, the sub-menu 1020 of the program icon 1012 may be a channel list icon 1024. When the controller 170 receives a command to select the program icon 1012 while the extended length of the display 180 is greater than the preset length, the controller 170 can display the channel list icon 1023 as the sub-menu 1020 of the program icon 1012. The channel list icon 1024 may mean display of a list of currently aired programs and other channels in the form of thumbnails.

As described above, the method of displaying the sub-menu 1020 in the display apparatus 100 according to an embodiment of the present disclosure may be different according to the extended length of the display 180. That is, the display apparatus 100 may display the sub-menu 1020 including more information as the extended length is longer.

Next, the icon selection signal corresponding to an input signal for changing the content 1001 will be described. Referring again to FIG. 13, when the icon selection signal is an input signal for changing the content 1001, the controller 170 can control the display 180 to switch into and display the content 1001 corresponding to the received icon selection signal.

The input signal for switching the content 1010 may mean an input signal for switching and displaying the content 1001 being currently displayed through the display 180. For example, when the icon selection signal received by the controller 170 is another channel selection signal of the channel list icon 1024, the controller 170 can recognize the input signal as a channel change signal for the content 1001 being currently displayed through the display 180. That is, the controller 170 can control the display 180 to switch into and display the content 1001 of a selected channel, instead of the content 1001 being currently displayed.

In addition, when the icon selection signal received by the controller 170 is a signal for selecting the video sharing application icon 1021, the controller 170 can recognize the input signal as an input signal for switching the content 1001 being currently displayed through the display 180 into content 1001 corresponding to the video sharing application. That is, the controller 170 can control the display 180 to switch into and display the content 1001 corresponding to the selected video sharing application, instead of the content 1001 being currently displayed.

Next, a method of operating the display apparatus 100 when an input signal for switching the content 1001 is received will be described with reference to FIGS. 18 to 20. In particular, FIG. 18 is an exemplary diagram illustrating a method of operating a display apparatus when an input signal for switching content is a channel switch signal.

As shown in (A) of FIG. 18, in a case where the content 1001 being displayed on the display 180 is content 1001 being transmitted on channel "AAA", when an icon selection signal received by the controller 170 is a selection signal for channel "BBB", which is another channel among the channel list icons 1024, the controller 170 can recognize the input signal as a channel change signal for the content 1001 being currently displayed through the display 180.

That is, as shown in (B) of FIG. 18, the controller 170 can control display 180 to switch into and display the content 1001 of channel "BBB", which is the selected channel, instead of the content 1001 of FIG. 18(A) that was being displayed. In addition, even when the channel information icon 1023 is displayed as shown in FIG. 17(A) according to the extended length of the display 180, the controller 170 can change the content 1001 according to an input signal for up, down, left, and right keys of the remote control device 200.

Figure 19:
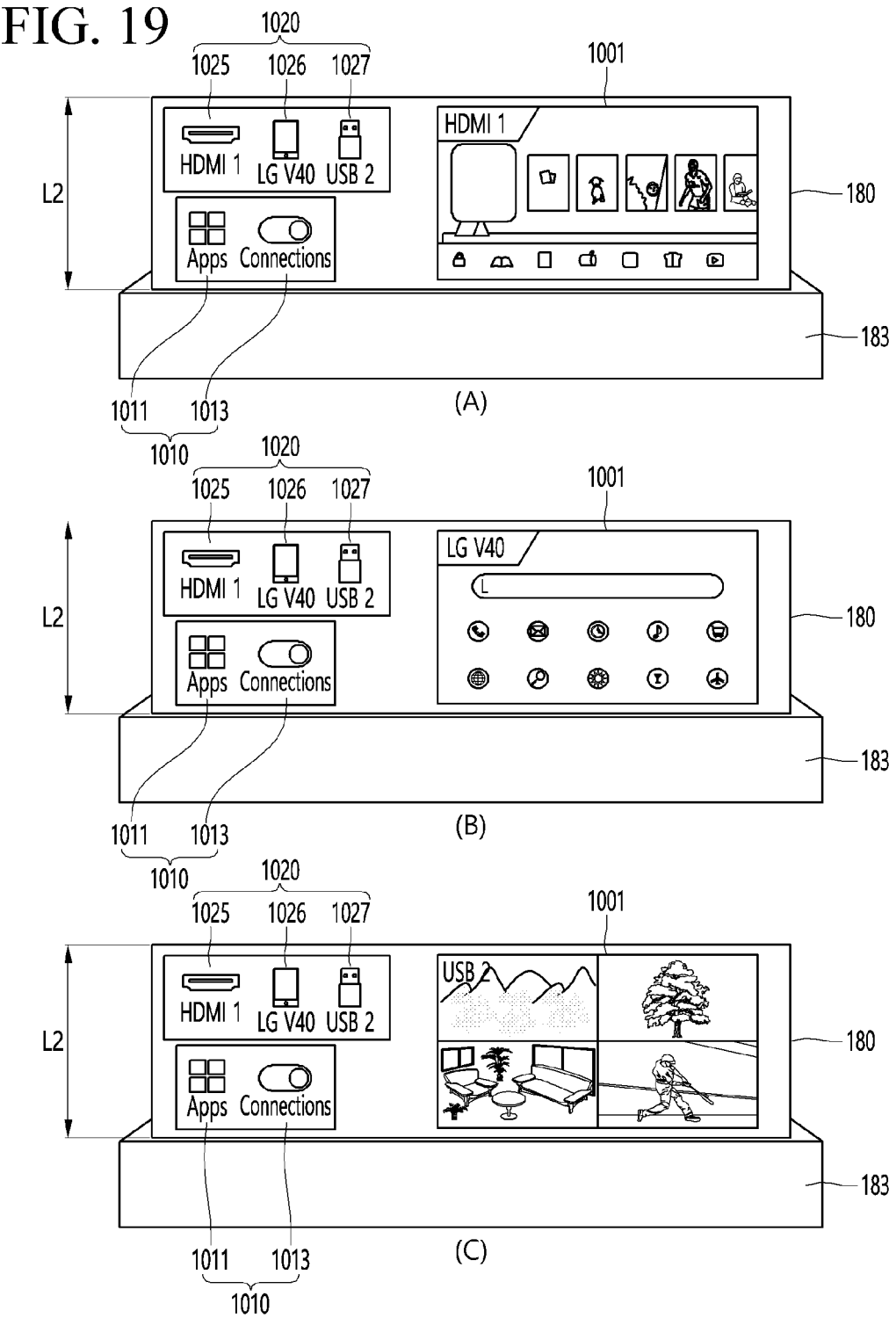
FIG. 19 is an exemplary diagram illustrating a method of operating a display apparatus when an input signal for switching content is a signal for switching into an external device image.

FIG. 19 is an exemplary diagram illustrating a method of operating a display apparatus when an input signal for switching content is a signal for switching into an external device image. The external device image is an image input from an external device as shown in (A) of FIG. 19, a mirroring image of an external device as shown in (B) of FIG. 19, or a thumbnail indicating a file stored in an external device as shown in (C) of FIG. 19.

As shown in (A) of FIG. 19, when the icon selection signal received by the controller 170 is the HDMI icon 1025 selection signal, the controller 170 can recognize the input signal as an input signal for switching the content 1001 being currently displayed through the display 180 to the content 1001 corresponding to the image of the external device connected to HDMI, and control the display 180 to switch into and display the content 1001 of the external device connected to HDMI, instead of the content 1001 being currently displayed.

Also, as shown in (B) of FIG. 19, when the icon selection signal received by the controller 170 is the smartphone icon selection signal for a smartphone connected to the display apparatus 100, the controller 170 can recognize the input signal as an input signal for switching the content 1001 being currently displayed through the display 180 to content 1001 corresponding to the image of the smartphone connected to the display apparatus 100, and control the display 180 to switch into and display the content 1001 which is the mirroring image of the smartphone connected to the display apparatus 100, instead of the content 1001 being currently displayed.

As shown in (C) of FIG. 19, when the icon selection signal received by the controller 170 is the USB icon 1027 selection signal, the controller 170 can recognize the input signal as an input signal for switching the content 1001 being currently displayed through the display 180 to the content 1001 corresponding to the image of the external device connected to a USB port, and control the display 180 to switch into and display the content 1001 of the external device connected to the USB port, instead of the content 1001 being currently displayed.

In the above-described embodiment, the display apparatus 100 according to the present disclosure may switch and display the content 1001 in response to the icon selection signal while the display 180 is being extended. The size, position, and arrangement of the menu 1010 or sub-menu 1020 and the content 1001 shown in the drawings are not fixed, and do not affect the scope of the present disclosure.

Returning again to FIG. 13, when receiving an extension stop command (S30), the controller 170 can control the display 180 to stop extension of the display 180 (S40). In this instance, the extension stop command for the display 180 may include an icon selection signal, an extension stop command by a user, a stop command according to the maximum extension of the display 180, and the like.

For example, the controller 170 can recognize the icon selection signal as the extension stop command for the display 180. In this instance, the controller 170 can control a roller 184 to stop extension of the display 180 immediately or to stop extension of the display 180 after the display 180 is extended to a preset length. The preset length may mean a length that is 80% of the maximum length of the display 180, but this is only given as an example for convenience of description.

In addition, when the extension of the display 180 is stopped before the display 180 is extended to the maximum length, the controller 170 can control the display 180 to display a screen indicating extension stop of the display 180.

FIG. 20 is an exemplary diagram illustrating a method of receiving a maximum extension command when the extension of the display apparatus is stopped before being extended to a maximum length according to an embodiment of the present disclosure. For example, when the extension of the display is stopped before reaching the maximum extension length of the display 180, the controller 170 can control the display 180 to display a screen indicating extension stop as shown in (A) of FIG. 20.

The screen indicating extension stop may be a screen indicating that extension is stopped before reaching the maximum extension length of the display 180. The screen indicating extension stop may include a full screen icon 1014. The full screen icon 1014 may mean an icon for receiving a command to display only the currently displayed content 1001 excluding the menu 1010 on the display 180. The full screen icon 1014 may mean an icon for selecting whether to extend the display 180 to the maximum length while displaying only the currently displayed content 1001 on the display 180.

That is, when the controller 170 receives a command to select the full screen icon 1014, the controller 170 can recognize it as receiving the maximum extension command for the display 180. In addition, the controller 170 can recognize that the maximum extension command is received even when no user input is detected for more than a predetermined time in a state in which extension is stopped at a preset length before the display 180 reaches the maximum extension length. For example, when the extension is stopped because the extended length of the display 180 reaches 80% of the maximum extension length, the controller 170 can control the roller 184 such that the display 180 is extended to the maximum extension length if no user input is detected for more than the predetermined time.

Accordingly, when receiving the maximum extension command, the controller 170 can extend the display 180 to the maximum extension length as shown in (B) FIG. 20 and control the display 180 to display only the content 1001 on the display 180. In this instance, L2 may be a length corresponding to 80% of the maximum extension length, and L4 may be the maximum extension length of the display 180.

Meanwhile, according to an embodiment of the present disclosure, while the display 180 is being extended, the position or arrangement of icons in the menus displayed on the display 180 may be changed. In this instance, when a user tries to select an icon, it may be difficult for the user to select a desired icon due to a change in the position or arrangement of the icons.

According to an embodiment of the present disclosure, when the pointer 205 is located on any one icon, the controller 170 can control the display 180 to allow the position of the pointer 205 to be fixed on the icon while the display 180 is extended or display an icon on which the pointer 205 is located to be fixed.

Next, a method of fixing the position of the pointer 205 and displaying the pointer 205 while the display 180 is being extended will be described with reference to FIG. 21. In particular, FIG. 21 is an exemplary diagram illustrating a method of displaying an icon and a pointer positioned on the icon in a display apparatus according to an embodiment of the present disclosure.

Figure 21:
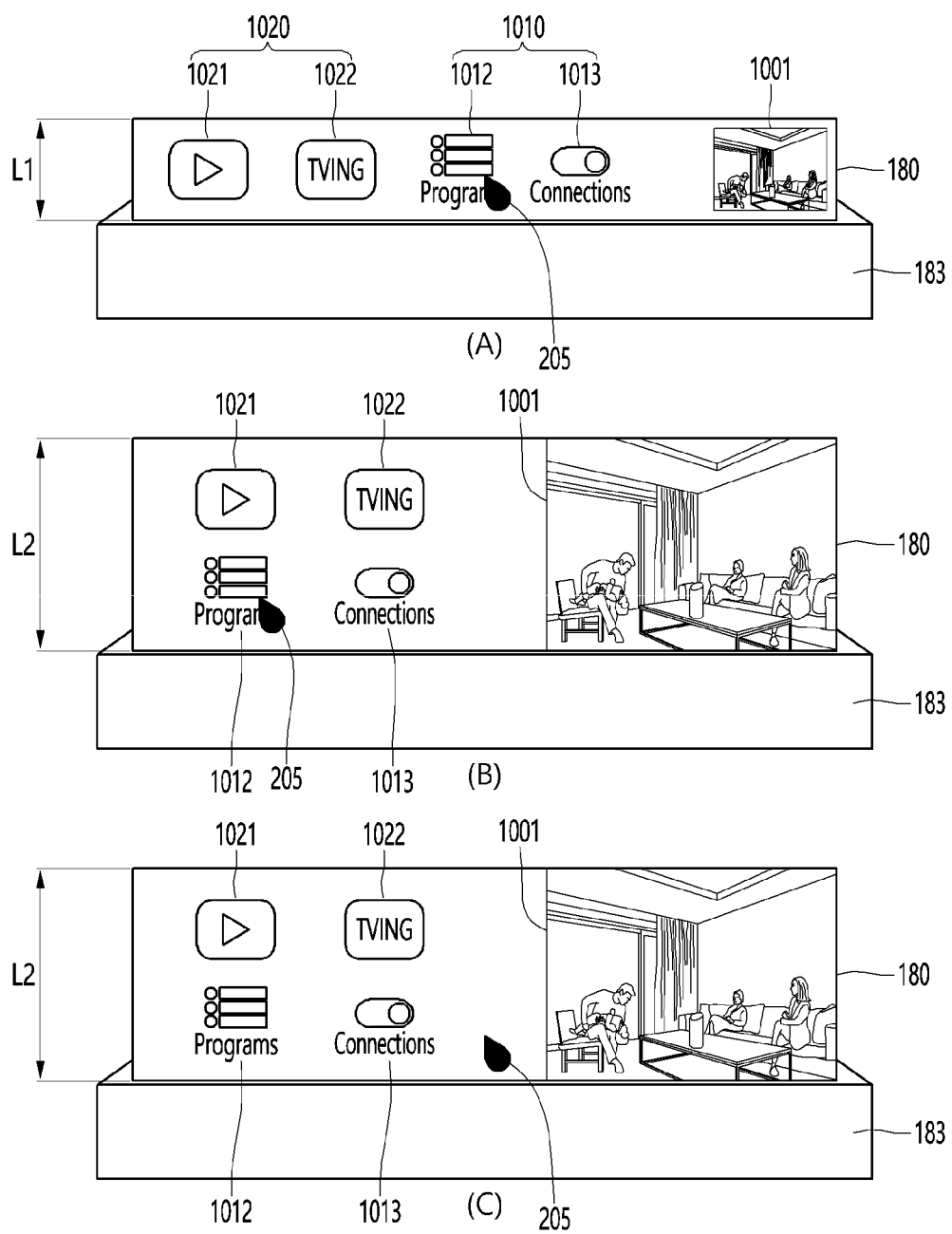
FIG. 21 is an exemplary diagram illustrating a method of displaying an icon and a pointer positioned on the icon in a display apparatus according to an embodiment of the present disclosure.

For example, as shown in (A) of FIG. 21, when the pointer 205 is located on any one icon in the menus, the position and arrangement of the icons may be changed as shown in (B) of FIG. 21, as the extended length of the display 180 increases from L1 to L2. In this instance, the controller 170 can control the display 180 to change of the position of the pointer 205 and display the pointer 205. That is, the controller 170 can recognize an icon being displayed in an area where the pointer 205 is located, and control the display 180 such that the pointer 205 is located on the recognized icon even when the position of the recognized icon is changed.

For example, when the pointer 205 is located on the program icon 1012 as shown in (A) of FIG. 21, the controller 170 can control the display 180 such that the pointer 205 is located and displayed on the program icon 1012 even when the position and arrangement of the icons are changed as shown in (B) of FIG. 21. On the other hand, as another example, even when the position of the icon is changed according to the extension of the display 180 as shown in (C) of FIG. 21, the controller 170 can control the display 180 to fix the position of the displayed pointer 205 and display the pointer 205.

When the pointer 205 is located on any one icon in the menu, the controller 170 can control the display 180 such that the position of the icon is fixed and the icon is displayed according to the extension of the display 180.

Next, a method of fixing and displaying an icon on which the pointer 205 is located while the display 180 is being extended will be described with reference to FIG. 22. In particular, FIG. 22 is an exemplary diagram illustrating a method of displaying an icon and a pointer positioned on the icon in a display apparatus according to an embodiment of the present disclosure.

Figure 22:
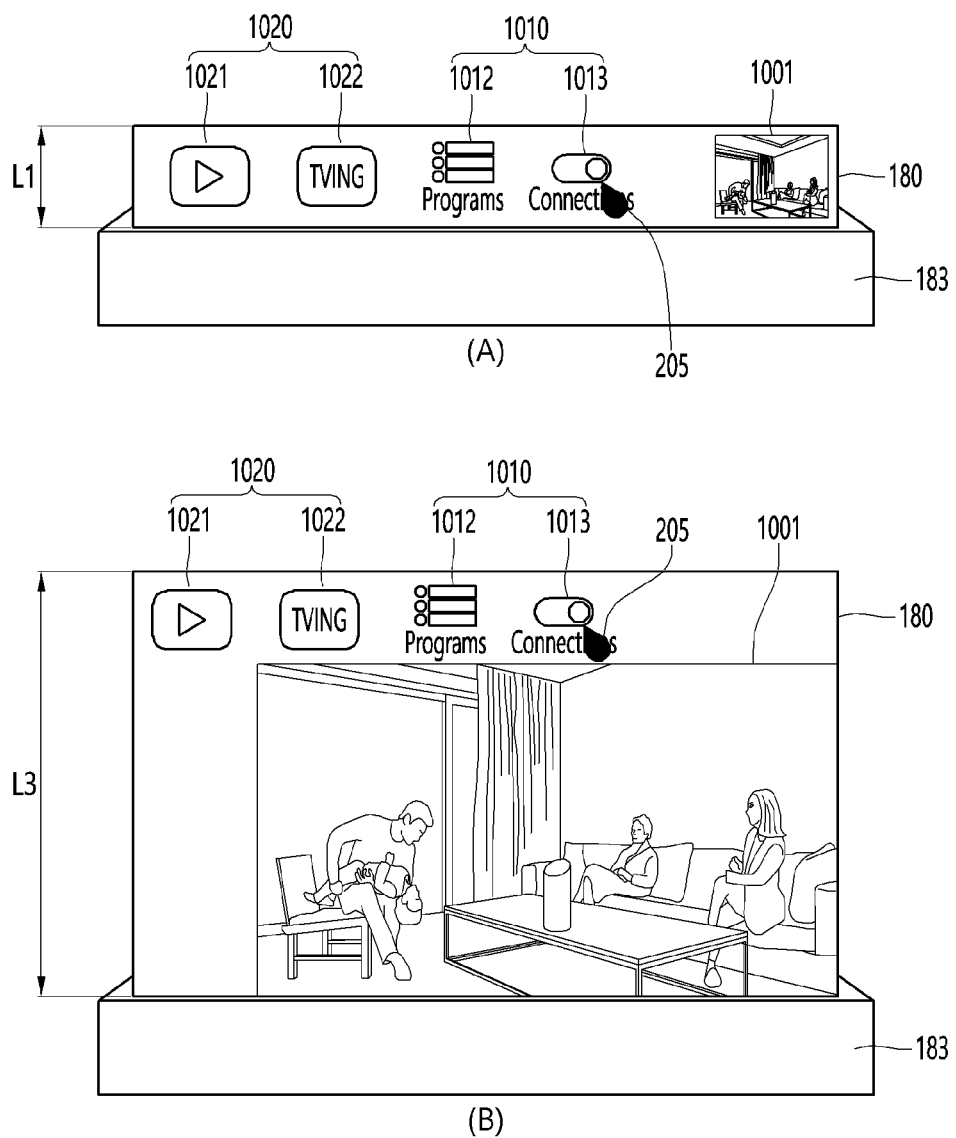
FIG. 22 is an exemplary diagram illustrating a method of displaying an icon and a pointer positioned on the icon in a display apparatus according to an embodiment of the present disclosure.

As shown in (A) of FIG. 22, when a pointer 205 is positioned on any one icon in a menu, the position of the icon may be changed according to the extension of the display 180. In this instance, the controller 170 can control the display 180 to display the icon at a fixed position as shown in (B) of FIG. 22. When the icon is fixed, the position or size of the content 1001 may be adjusted according to the fixed icon position.

According to this embodiment, it is possible to provide the display apparatus 100 capable of allowing a user to easily perform selection when the user tries to select an icon displayed on the display 180 while the display 180 is being extended.

According to another embodiment of the present disclosure, it is possible to provide the display apparatus 100 capable of allowing the user to grasp the contents of the content 1001 even when only a part of the content 1001 is displayed while the display 180 is being extended.

The display apparatus 100 according to the embodiment of the present disclosure may control a manner for displaying the content 1001 so as to allow the user to grasp the contents of the content 1001 even when only a part of the content 1001 is displayed while the display 180 is being extended. For example, the controller 170 can display a main part of the content 1001 first while the display 180 is being extended.

The main part of the content 1001 may mean a partial part of the content 1001 that enables the user to immediately grasp the contents of the content 1001 even when the entire content 1001 is not displayed. The main part of the content 1001 may be different depending on the type of the content 1001. For example, when the content 1001 is a news image, a main part may be a subtitle, and when the content 1001 is a drama, the main part may be an actor/actress's face.

The controller 170 can determine a main part of the content 1001 being displayed, and control the display 180 such that the main part is displayed first in an extended portion of the display 180.

Next, a method of controlling the display form of content 1001 in the display apparatus 100 will be described with reference to FIG. 23. In particular, FIG. 23 is an exemplary diagram illustrating a method of controlling a display form of content in a display apparatus according to an embodiment of the present disclosure.

For example, when the content 1001 being displayed on the display 180 is a news image, the controller 170 can determine the subtitle of the content 1001 as a main part. In this instance, when the display 180 is extended by L1 as shown in (A) of FIG. 23, the controller 170 can control the display 180 to sequentially display the subtitles of the content 1001 in the extended area. When the display 180 is additionally extended by L2 as shown in (B) of FIG. 23, the controller 170 can control the display 180 to additionally display parts other than the subtitles of the content 1001 according to the additionally-extended length of the display 180. When the display 180 is additionally extended by L3 as shown in (C) of FIGS. 23 and L3 is the maximum extended length of the display 180, the controller 170 can control the display 180 to display the entire content 1001.

According to the embodiments described above, it is possible to provide the display apparatus 100 capable of allowing a user to grasp the contents of the content 1001 even when the display 180 is not fully extended.

Each of the embodiments disclosed herein may be practiced alone, or may be practiced in combination with other embodiments. The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The invention claimed is:

1. A display apparatus comprising:
a housing;
a display;
a roller accommodated in the housing to rotate and roll or unroll the display; and
a processor configured to:
in response to receiving a command to display content, control the roller to rotate and unroll the display from the housing so the display is drawn out and extended from the housing,
control the display to display an entire image of the content while simultaneously expanding a size of the entire image of the content as the display is being extended from the housing,
control the display to display a menu which includes at least one icon to select information to be displayed on the display, and
control the roller to stop unrolling the display when an input signal selecting the at least one icon is acquired.

2. The display apparatus of claim 1, wherein the processor is configured to control the display to display the content while maintaining an image ratio of the content as the display is being drawn out and extended from the housing.

3. The display apparatus of claim 1, wherein the processor is configured to control the roller to stop unrolling the display from the housing in response to a stop command requesting the display stop being drawn out and extended from the housing, and control the display to display a full screen menu option to continue the display being drawn out and extended from the housing and to display a full screen of the content.

4. The display apparatus of claim 1, wherein the processor is configured to increase the image size of the content and maintain an image ratio of the content as the display is being drawn out and extended from the housing.

5. The display apparatus of claim 4, wherein the processor is configured to maintain the image ratio of the content, and adjust the image size of the content to a maximum size according to an extended length of the display.

6. The display apparatus of claim 1, wherein the processor is configured to control the display to display the menu in an area other than where the content is displayed.

7. The display apparatus of claim 1, wherein the processor is configured to:
in response to an input signal selecting the displayed menu, control the display to display a sub-menu corresponding to the input signal instead of the menu.

8. The display apparatus of claim 1, wherein the processor is configured to:
display an external device option for receiving a content from an external device, and
in response to a selection of the displayed external device option, control the display to display the content from the external device, instead of previously displayed content.

9. The display apparatus of claim 1, wherein the content is a broadcast image, and
wherein the menu includes at least one of an application icon, a program icon, and an external device icon.

10. The display apparatus of claim 1, wherein the processor is configured to control the roller to extend the display to a preset length in response to an input signal selecting the menu.

11. The display apparatus of claim 1, wherein the processor is configured to control the display to display a screen indicating an extension of the display is going to be stopped before the display is extended to a maximum length.

12. The display apparatus of claim 11, wherein the screen indicating the extension of the display is going to be stopped further includes an icon for selecting whether to extend the display to the maximum length, and
wherein the processor is configured to control the roller to unroll the display such that the display is extended to the maximum length in response to the selection command for the icon being received.

13. The display apparatus of claim 1, wherein the processor is configured to control the display to display the content in a list form when an extended length of the display is less than or equal to a preset first length.

14. The display apparatus of claim 13, wherein the processor is configured to control the display to display the content in a thumbnail form when the extended length of the display is greater than the first length and less than or equal to a second length longer than the first length.

15. The display apparatus of claim 14, wherein the processor is configured to control the display to display the content in a full screen form when the extended length of the display is greater than the second length and less than or equal to a third length longer than the second length.

16. The display apparatus of claim 1, wherein the processor is configured to control the display to display user preference information when displaying the content in a list form or a thumbnail form.

17. The display apparatus of claim 1, wherein the processor is configured to fix a position of a pointer on an icon when the pointer is located on any one icon as the display is being drawn out and extended from the housing.

18. The display apparatus of claim 1, wherein the display apparatus comprises a zero view mode in which the display is entirely drawn into the housing, a partial view mode in which the display is partially drawn out of the housing, and a full view mode in which the display is maximally drawn out of the housing, and
　　wherein the entire view image of the content is displayed in the partial view mode and the full view mode.

\* \* \* \* \*